(12) United States Patent
Abe et al.

(10) Patent No.: US 12,221,051 B2
(45) Date of Patent: Feb. 11, 2025

(54) STEERING WHEEL

(71) Applicant: Autoliv Development AB, Vargarda (SE)

(72) Inventors: Kazuhiro Abe, Kanagawa (JP); Ryotaro Ishida, Kanagawa (JP); Sumit Kumar, Kanagawa (JP); Keisuke Honma, Kanagawa (JP); Jinkeun Kim, Kanagawa (JP); Rodel Go, Kanagawa (JP); Hiroaki Asai, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/555,162

(22) PCT Filed: Mar. 14, 2022

(86) PCT No.: PCT/JP2022/011181
§ 371 (c)(1),
(2) Date: Oct. 12, 2023

(87) PCT Pub. No.: WO2022/219982
PCT Pub. Date: Oct. 20, 2022

(65) Prior Publication Data
US 2024/0198947 A1     Jun. 20, 2024

(30) Foreign Application Priority Data
Apr. 15, 2021 (JP) ................. 2021-069285

(51) Int. Cl.
*B60R 21/203* (2006.01)
*B62D 1/10* (2006.01)
*B62D 7/22* (2006.01)

(52) U.S. Cl.
CPC ............ *B60R 21/2037* (2013.01); *B62D 1/10* (2013.01); *B62D 7/222* (2013.01)

(58) Field of Classification Search
CPC ............ B60R 21/2037; B60R 21/2035; B60R 21/2032; B60R 21/203; B62D 7/222
See application file for complete search history.

(56) References Cited

U.S. PATENT DOCUMENTS 7,007,969 B2 * 3/2006 Abe ................... B60Q 5/003
                                                        280/728.1
9,016,719 B2 * 4/2015 Amamori ........... B60R 21/203
                                                        280/731

(Continued)

FOREIGN PATENT DOCUMENTS

JP        9-254791 A      9/1997
JP     2011-105164 A      6/2011

(Continued)

OTHER PUBLICATIONS

Computer generated English translation of JP 2020-251156 (Year: 2024).*

*Primary Examiner* — Paul N Dickson
*Assistant Examiner* — Tiffany L Webb
(74) *Attorney, Agent, or Firm* — Foley & Lardner LLP

(57) ABSTRACT

A steering wheel is disclosed enabling suppressing unnecessary rocking of the airbag module during airbag activation and thereby ensures prescribed deployment performance of the airbag cushion. In detail, the steering wheel is provided with a core metal having a boss part configured so as to be mountable on a steering shaft and an airbag module movably provided with respect to the core metal and having an airbag cushion that can be expanded and deployed. The stopper of the core metal is separated from the stopper contact part of the airbag module in a non-activated state of the airbag, and comes into contact with the stopper contact part due to movement or deformation of the airbag module caused by expansion and deployment of the airbag cushion during activation of the airbag.

14 Claims, 19 Drawing Sheets

(56) References Cited

U.S. PATENT DOCUMENTS

| | | | |
|---|---|---|---|
| 9,126,556 B2 * | 9/2015 | Sakaguchi | B60R 21/2037 |
| 10,875,564 B2 * | 12/2020 | Minami | B62D 7/222 |
| 11,420,554 B2 * | 8/2022 | Groleau | B60Q 5/003 |
| 2024/0149821 A1 * | 5/2024 | Kim | B60Q 5/003 |

FOREIGN PATENT DOCUMENTS

| | | | |
|---|---|---|---|
| JP | 2012-86697 A | | 5/2012 |
| JP | 2014-94703 A | | 5/2014 |
| JP | 2020128156 A | * | 8/2020 |
| WO | 2015/125349 A1 | | 8/2015 |

* cited by examiner

FIG. 2
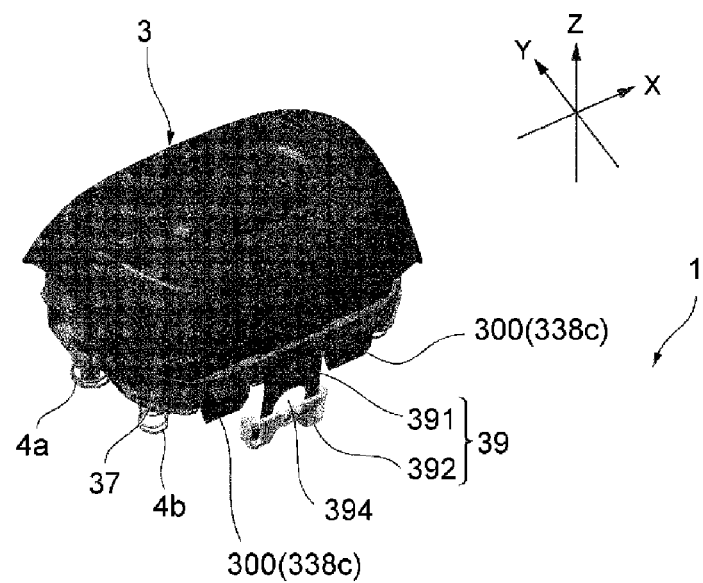
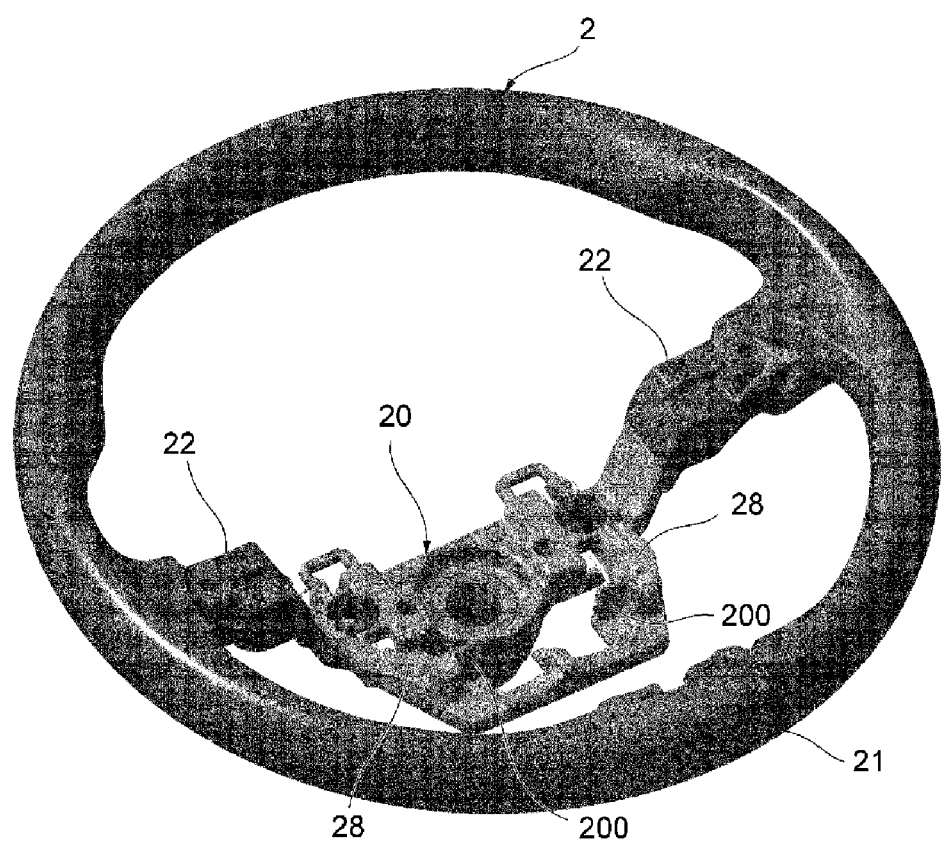

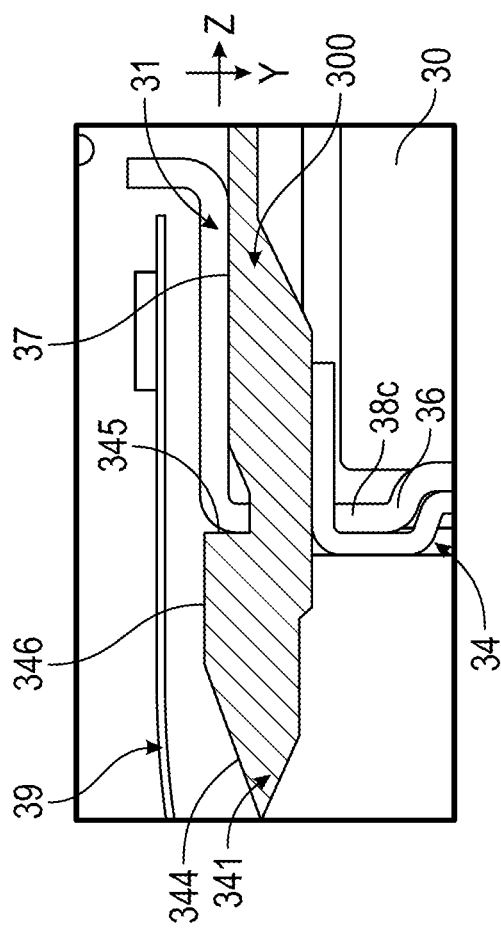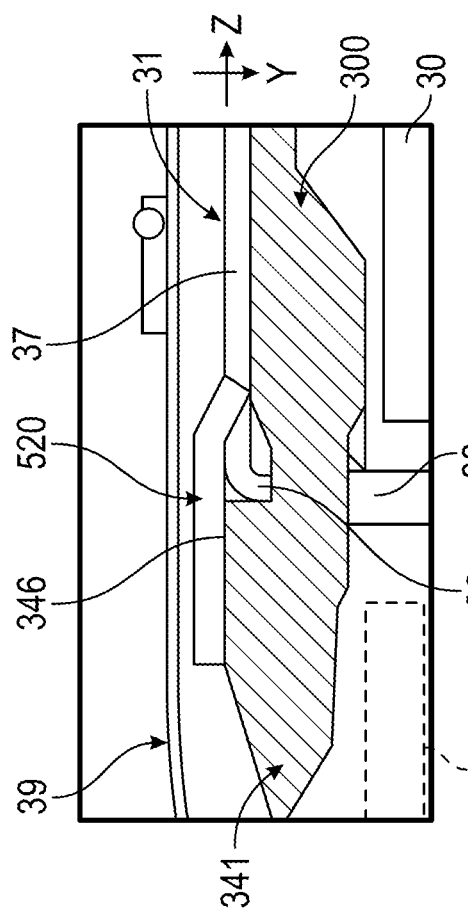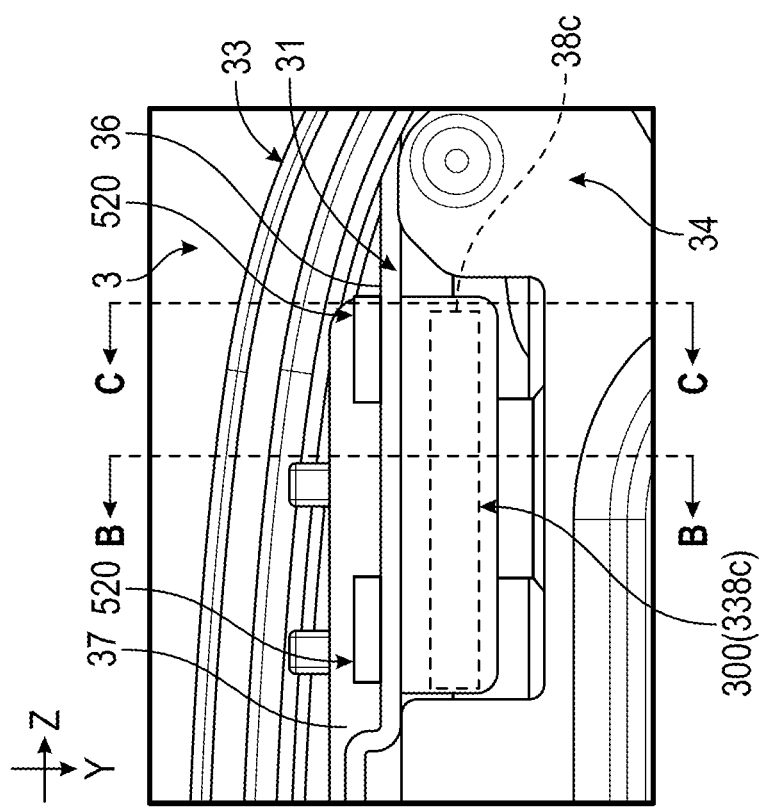

STEERING WHEEL

TECHNICAL FIELD

The present invention relates to a steering wheel. In detail, the present invention relates to a steering wheel provided with a core metal having a boss part configured so as to be mountable on a steering shaft and an airbag module movably provided with respect to the core metal and having an airbag cushion that can be expanded and deployed.

BACKGROUND ART

There are known steering wheels installed in a vehicle equipped with a function as a front airbag in the event of a vehicle emergency. For example, in Patent Document 1, the steering shaft is mounted to a boss part of the core metal and a floating unit is provided on both left and right sides and on the bottom, as viewed from the steering shaft. Furthermore, a horn block composed of the airbag module and a steering pad is movably supported on the core metal by these three floating units.

RELATED ART DOCUMENTS

Patent Documents

Patent Document 1: WO 2015/125349

SUMMARY OF THE INVENTION

Problem to be Solved by the Invention

When the airbag is activated and the airbag cushion of the airbag module expands and deploys, the airbag module is supported by the floating unit, but the floating portion of the floating unit is expected to rock. On the other hand, the function of supporting the airbag cushion should be supported in a rigid manner.

An object of the present invention is to provide a steering wheel that can suppress unnecessary rocking of the airbag module during airbag activation and ensure prescribed deployment performance of the airbag cushion.

Means for Solving the Problem

A steering wheel according to an aspect of the present invention includes:
- a core metal having a boss part configured so as to be mountable on a steering shaft; and
- an airbag module movably provided with respect to the core metal and having an airbag cushion that can be expanded and deployed, wherein
- a first of the core metal and the airbag module includes a stopper and a second of the core metal and the airbag module includes a stopper contact part,
- the stopper is configured to be separated from the stopper contact part while the airbag is in a non-activated state, and to come into contact with the stopper contact part due to movement and deformation of the airbag module caused by expansion and deployment of the airbag cushion during airbag activation.

With this aspect, interference (contact between the stopper and the stopper contact part) occurs between the core metal and the airbag module moved or deformed during activation of the airbag. Thus, unnecessary rocking of the airbag module with respect to the core metal can be suppressed during activation of the airbag. Moreover, this suppression of rocking can be achieved by effectively using the core metal and the airbag module while ensuring movability of the airbag module relative to the core metal while the airbag is in a non-activated state.

BRIEF DESCRIPTION OF THE DRAWINGS

FIG. 2 is an exploded perspective view depicting a state of an airbag module having been removed from a core metal regarding the steering wheel in FIG. 1;

FIG. 14 is a diagram depicting a reinforcement part according to a second example of Embodiment 1, where (A) is an airbag module bottom surface enlarged view of the stopper contact part and reinforcement part area, (B) is a cross section view along line B-B in (A), and (C) is a cross section view along line C-C in (A);

DESCRIPTION OF THE PREFERRED EMBODIMENTS

A steering wheel according to a preferred embodiment of the present invention will be described.

The steering wheel is arranged on the driver seat side of a vehicle such as an automobile, and has a plurality of functions. For example, the steering wheel functions as a vehicle steering device. Specifically, the steering wheel is generally attached in an inclined state to an upper end section of a steering shaft provided on a vehicle body. Furthermore, steering force from the driver is transmitted from the steering wheel to the steering shaft, and transmitted to wheels via a steering gear or the like, thereby changing the direction of the wheels.

In addition, the steering wheel also functions as a front airbag in the event of a vehicle emergency. An example of a vehicle emergency is a time when a vehicle collision occurs. The steering wheel functioning as a front airbag is mainly achieved by an airbag module installed on the core metal of the steering wheel. In addition to these functions, the steering wheel has a function as a horn device. In addition, the steering wheel may have a function as a dynamic damper for damping vibration from the vehicle to the steering wheel and this function is achieved by using the airbag module as a damper mass.

Figure 1:
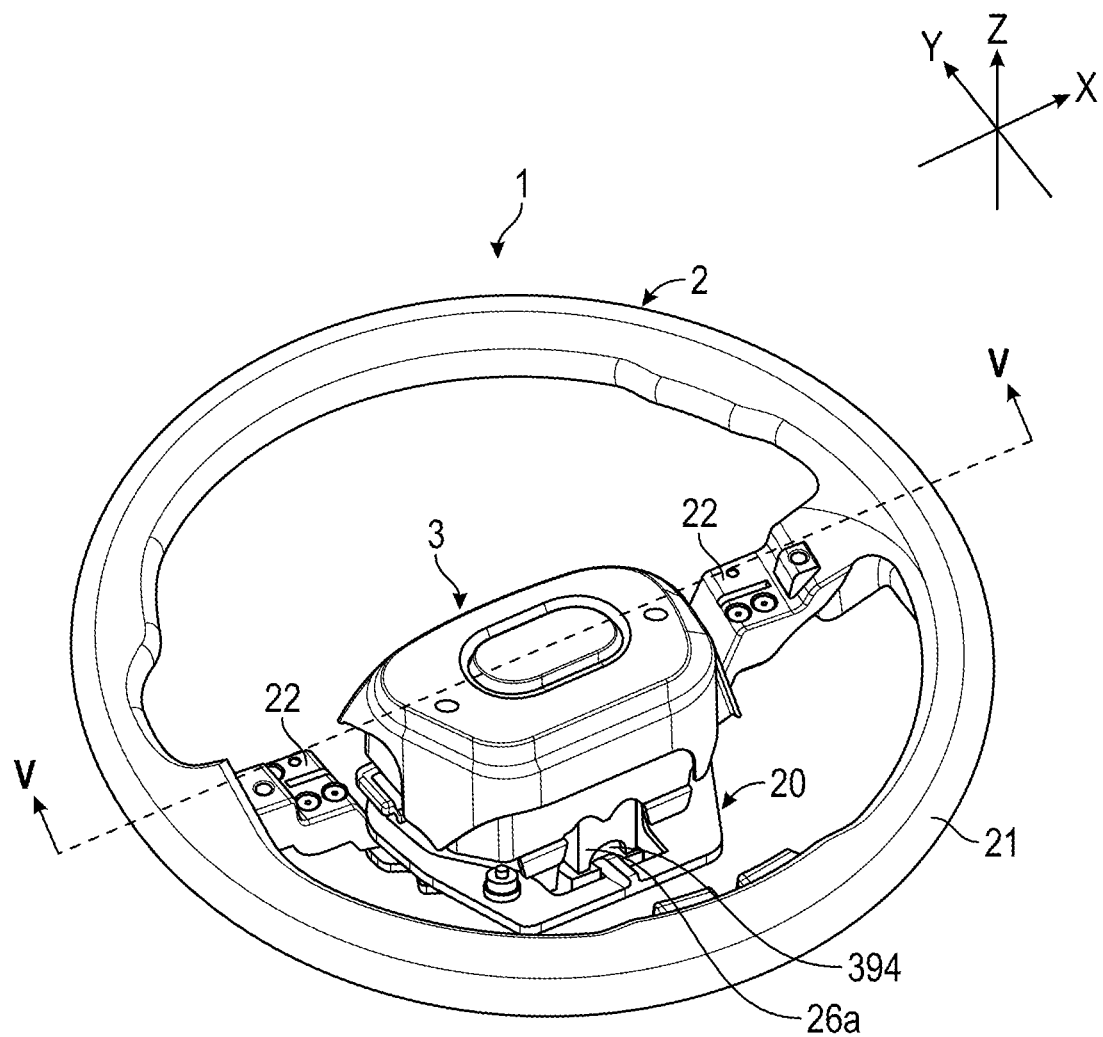
FIG. 1 is a perspective view depicting the appearance of a steering wheel according to Embodiment 1.

In the following, for convenience of explanation, the three axes of XYZ are defined as follows. The axial direction of the steering shaft is defined as the "Z-axis direction", the direction connecting 9 o'clock and 3 o'clock on an analog 12-hour clock on a flat surface orthogonal to the Z-axis direction is defined as the "X-axis direction", or "horizontal axis" direction, and the direction connecting 12 o'clock and 6 o'clock on the same clock is defined as the "Y-axis direction", or "vertical axis" direction. The vertical and horizontal axes are orthogonal to each other and to the Z-axis direction. The X-axis (horizontal axis) direction can be a direction corresponding to the width direction of the steering wheel or vehicle. The Y-axis (vertical axis) direction can be the front-to-back direction of the vehicle (direction of travel when the vehicle is going straight). A plane defined by the X-axis and the Y-axis is called an "XY plane". Furthermore, the directions the arrows face for the X, Y, and Z axes in FIG. 1 is defined to be the "positive side" and the opposite direction is the "negative side". Therefore, for example, the positive side in the Y-axis direction is 12 on a 12-hour analog clock and the Y-axis direction negative side is 6 on this same clock.

Embodiment 1

As illustrated in FIGS. 1 and 2, a steering wheel 1 has a core bar 2 and an airbag module 3. The airbag module 3 is provided so as to be movable relative to the core metal 2. In the present embodiment, the steering wheel 1 contains two types of support units 4a and 4b including a spring structure. Furthermore, the airbag module 3 is supported by the support units 4a and 4b so as to be movable relative to the core metal 2 along the Z-axis direction. In addition, while being supported by the support units 4a and 4b, the airbag module 3 pivots relative to the core metal 2 in a direction that intersects with the Z-axis direction (for example the XY plane) during airbag activation.

The core metal 2 forms the skeleton of the steering wheel 1. The core metal 2 is composed of, for example, metal such as iron, aluminum, magnesium, or the like. The core metal 2 includes a boss part 20 configured so as to be mountable on a steering shaft 100 (see FIG. 5). In addition, the core metal 2 includes a rim part 21 configured on the outer circumference of the steering wheel 1 and spoke parts 22 connecting the boss part 20 and the rim part 21. The rim part 21 is the part that the driver grips and is formed in a circular shape. There are a plurality of spoke parts 22 (two in this case) that respectively extend from the boss part 20 outward and connect to the rim part 21. In other embodiments, there may be three or more spoke parts 22.

Figure 3:
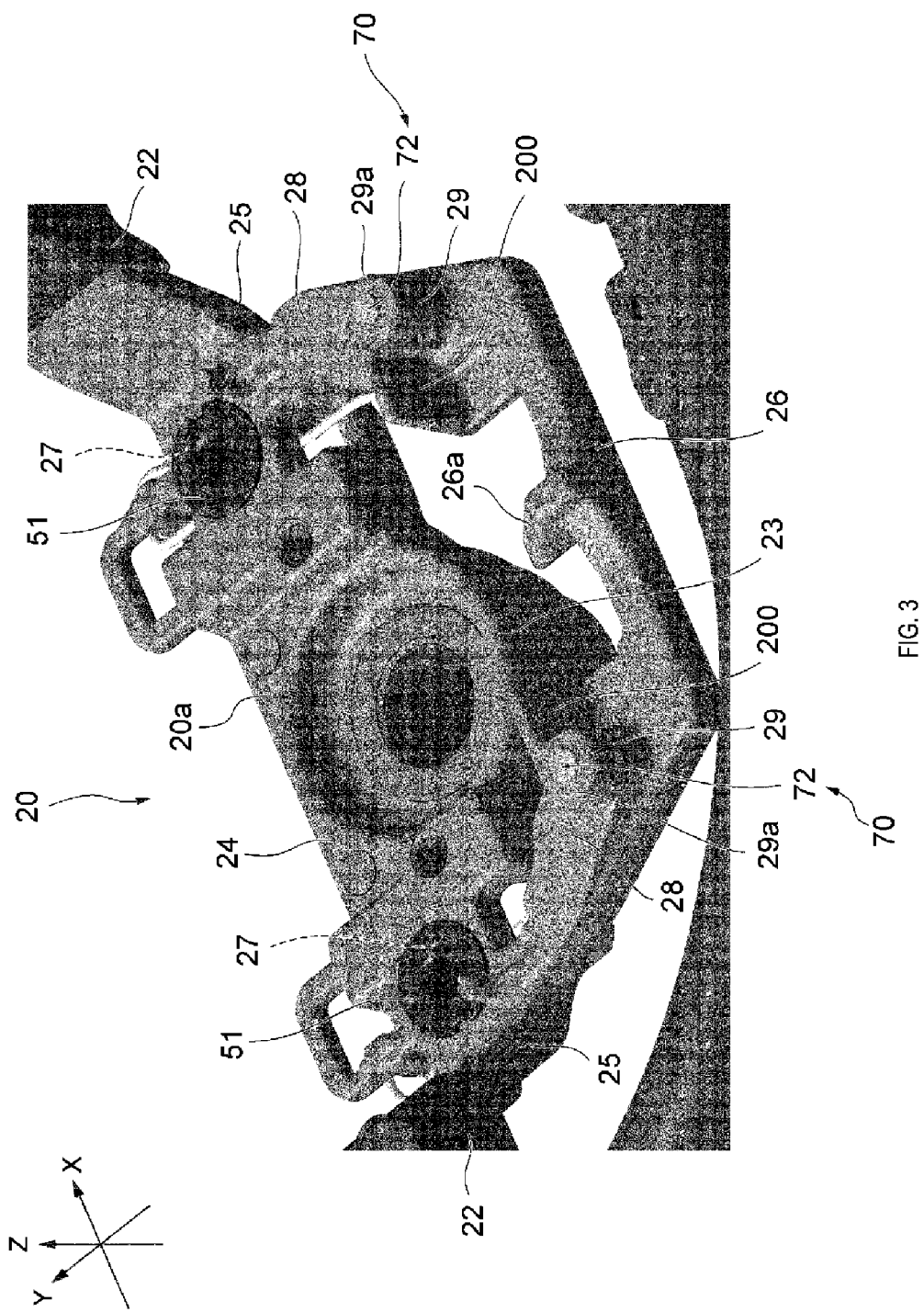
FIG. 3 is an enlarged perspective view depicting a boss part of the core metal of the steering wheel in FIG. 1.

As depicted in FIG. 3, the boss part 20 includes a shaft mounting part 23 that the steering shaft 100 is mounted on, a base part 24 formed in the center of the shaft mounting part 23 in a recessed shape, inclined parts 25 and 25 rising diagonally from both ends in the X-axis direction of the base part 24 and connected to the spoke parts 22, and a bridging part 26 that connects both ends of the base part 24 in the X-axis direction at the Y-axis direction negative side of the base part 24, at a position separated from the shaft mounting part 23.

A plurality (two in this case) of mounting holes 27 and 27 are formed on both sides of the base part 24 in the X-axis direction across the shaft mounting part 23 (see FIG. 5) and a cylindrical collar 51 is installed in each mounting hole 27. The collar 51 includes a flange part 53 at a first end having a notch part, part way along a cylinder part (see FIG. 5) and a pin 41, described below, of the support unit 4a is inserted into the cylinder part. A tab engaging part 26a protruding toward the shaft mounting part 23 is formed at the center of the bridging part 26. A tab 39, described below, of the airbag module 3 is elastically engaged in the Y-axis direction positive side to the tab engaging part 26a in a detachable manner (see FIGS. 1 and 2).

In addition, the boss part 20 includes a base surface 20a on the Z-axis direction positive side plane (surface). A large part of the base surface 20a faces the bottom part of the airbag module 3. In addition, the base surface 20a has flat spring receiving surfaces 28 and 28 at a position more in the Y-axis direction negative side than the mounting holes 27 and 27. The spring receiving surface 28 receives a first end of the support unit 4b. Protruding parts 29, 29 that protrude from the base surface 20a in the Z-axis direction positive side are formed between the spring receiving surfaces 28, 28 and the bridging part 26. Furthermore, stoppers 200, 200 are formed on the boss part 20 so as to connect with the base surface 20a and the protruding part 29 (details described below).

Figure 4:
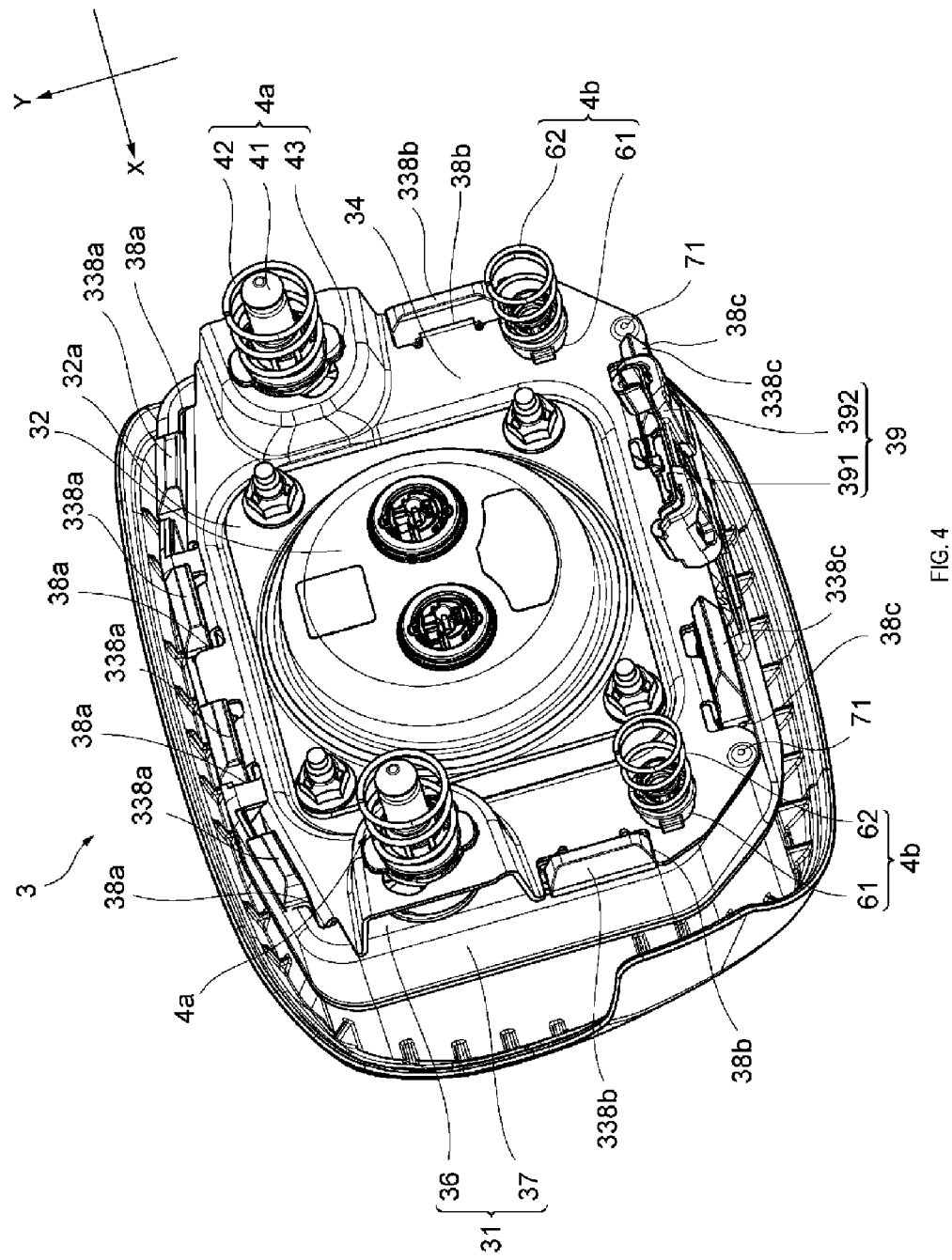
FIG. 4 is a perspective view depicting the airbag module of the steering wheel in FIG. 1 from the bottom.
Figure 5:
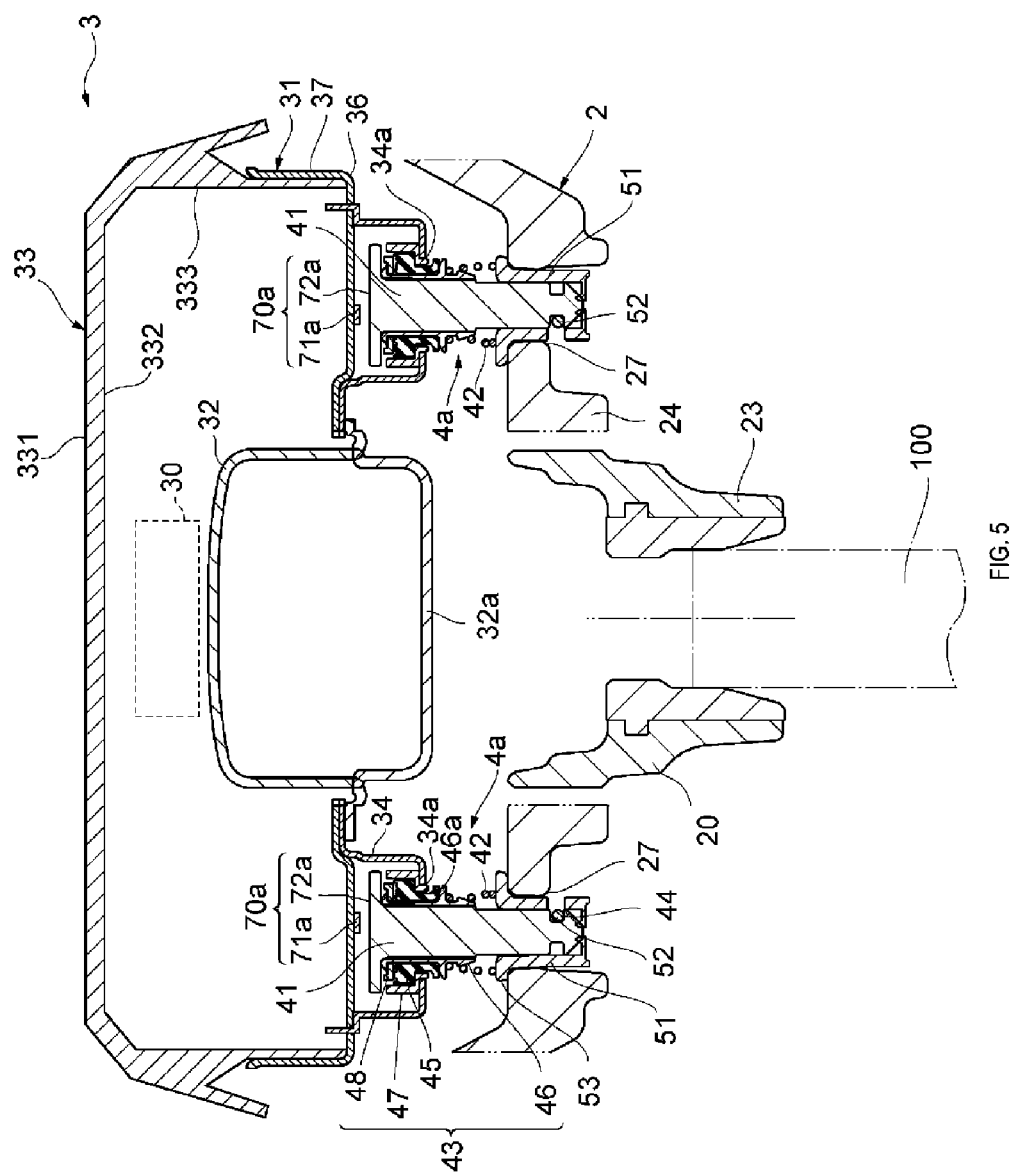
FIG. 5 is a cross section view of a cross section along line V-V of FIG. 1.

As depicted in FIG. 4, the airbag module 3 includes an airbag cushion 30 that can expand and deploy. In addition, as depicted in FIGS. 4 and 5, the airbag module 3 includes a housing 31 in which the airbag cushion 30 is stowed, an inflator 32 for supplying gas for expansion and deployment to the airbag cushion 30 during airbag activation, a module cover 33 mounted on the housing 31 so as to cover the airbag cushion 30, and a locking plate 34 mounted on the housing 31. The airbag cushion 30 is in, for example, a folded state in the housing 31.

The housing 31 has a bottom wall 36 with a bottom surface in the XY plane and a peripheral wall 37 rising from the bottom wall 36 and overall is formed in a shallow dish shape. The housing 31 is, for example, press molded from a single metal plate. The inflator 32 is mounted in the center of the bottom wall 36 and a plurality of engagement slits 38a, 38b, and 38c are formed in the peripheral edge of the bottom wall 36. Engagement protrusions 338a, 338b, and 338c, described below, of the module cover 33 are inserted into and engage with the engagement slits 38a, 38b, and 38c. Here, four engagement slits 38a are formed on the Y-axis direction positive side, one each engagement slit 38b is formed on both sides in the X-axis direction, and two engagement slits 38c are formed on the Y-axis direction negative side.

In addition, a spring-loaded tab 39 is mounted on the housing 31. As depicted in FIGS. 2 and 4, the tab 39 includes a cantilevered plate spring 391 and an insulator 392 provided on the free end side of the plate spring 391. The plate spring 391 has a first end mounted to the surface of the peripheral wall 37 on the Y-axis direction negative side and extends in the Z-axis direction negative side. The mounting position of the plate spring 391 is centered in the X-axis direction of the airbag module 3. Together with the insulator 392, the plate spring 391 forms a receiving opening 394 into which the tab engaging part 26a of the core metal 2 is inserted. The receiving opening 394 is formed larger than the tab engaging part 26a, thereby permitting the airbag module 3 to move relative to the core metal 2 (see FIG. 1). With the tab engaging part 26a inserted into the receiving opening 394, the end surface (upper surface) of the insulator 392 on the receiving opening 394 side is in contact with or faces the lower surface of the tab engaging part 26a, or the surface of the insulator 392 on the Y-axis direction negative side is in elastic contact with the root portion (side surface of the core metal 2 bridging part 26) of the tab engaging part 26a. Therefore, vibration of the core metal 2 is dampened by the elastic action of the plate spring 391.

The inflator 32 has a low-profile hollow disc body with gas discharge holes. In the event of a vehicle emergency, the inflator 32 is activated upon receiving a signal from the vehicle sensors and immediately supplies gas to the airbag cushion 30. In other words, the airbag changes from non-activated state to airbag activation. The airbag cushion 30 supplied with gas rapidly expands, ruptures the module cover 33, expands toward the driver's side of the vehicle interior space, and restrains the driver.

The locking plate 34 is mounted on the bottom wall 36 of the housing 31. The locking plate 34 is positioned separated from the engagement slits 38a, 38b, and 38c. In addition, the locking plate 34 includes a flat portion that is mounted on the bottom wall 36 and opening parts 34a and 34a in a portion raised from the flat portion so as to be separated from the bottom wall 36 and pins 41 of the support unit 4a are inserted into each of the opening parts 34a. A securing plate 32a for the inflator 32 is mounted on the bottom wall 36 at the portion where the locking plate 34 is mounted. The locking plate 34 is, for example, press molded from a single metal plate.

In other embodiments, the locking plate 34 may be omitted. In this case, the structure and function related to the locking plate 34 are provided on a separate member of the airbag module 3, for example, the housing 31. In the case of having a locking plate 34, the bottom part of the airbag module 3 facing the core metal 2 is primarily composed of the locking plate 34, and in the case of not having a locking plate 34, the bottom part of the airbag module is composed of the bottom wall 36 of the housing 31.

Figure 6:
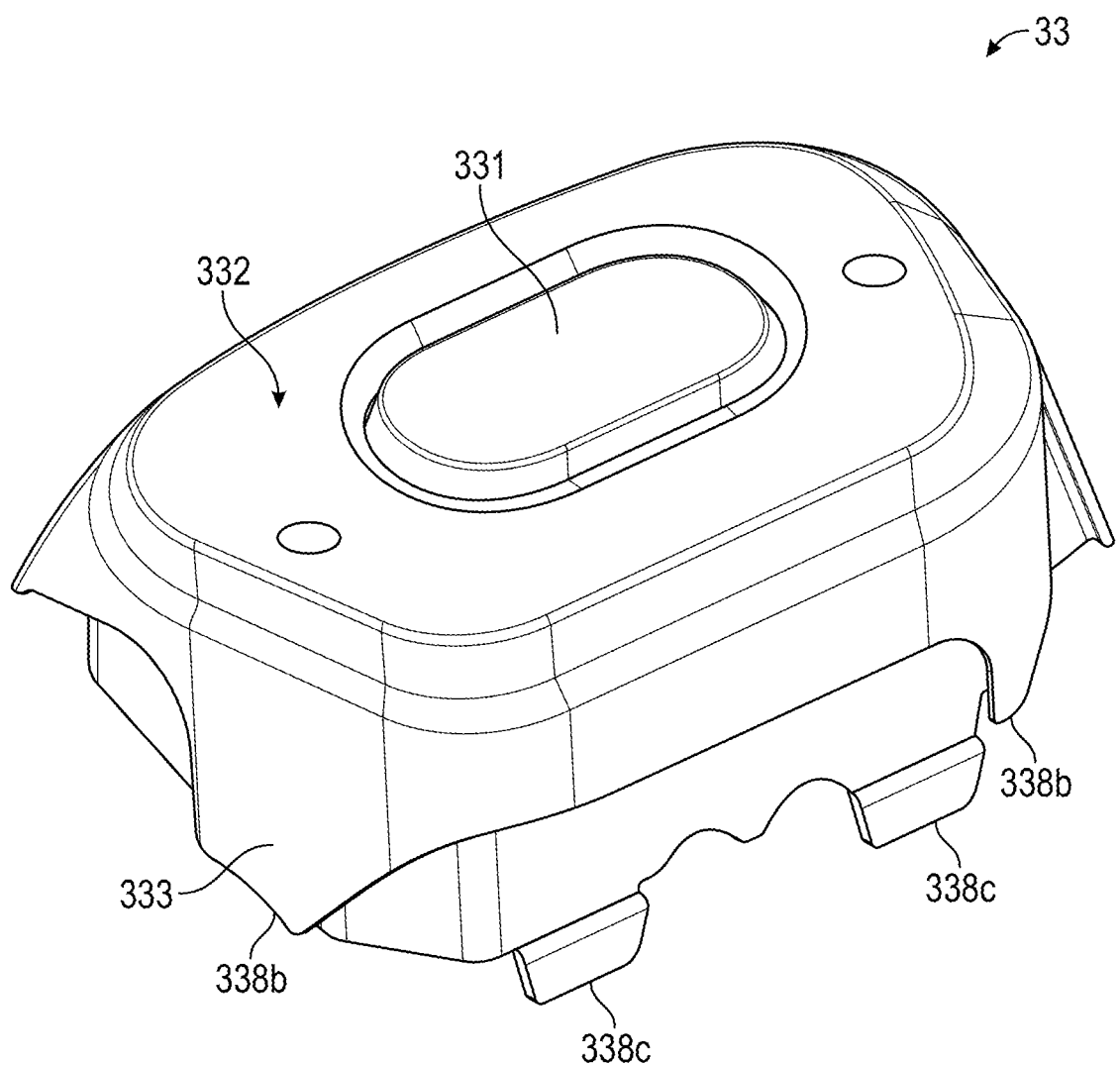
FIG. 6 is a perspective view depicting a module cover of the airbag module from above.
Figure 7:
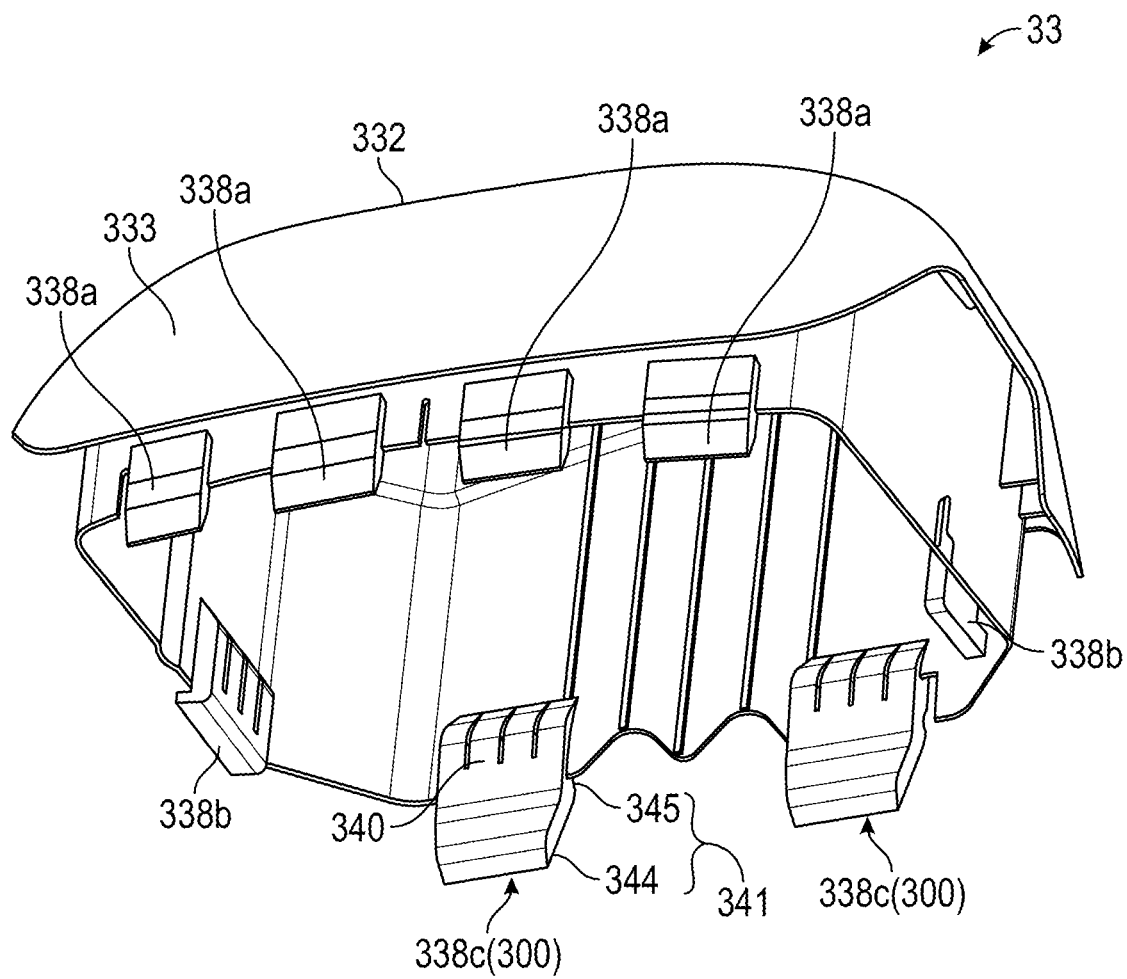
FIG. 7 is a perspective view depicting the module cover of the airbag module from below.

As depicted in FIGS. 6 and 7, the module cover 33 has a top wall 332 with a top surface 331 in the XY plane and a peripheral wall 333 suspended from the top wall 332. The top surface 331 is pressed by the driver to sound the horn. In other words, the module cover 33 functions as a horn switch pressed by the driver when sounding the horn. For the module cover 33, the side opposite the top wall 332 is open and a part of the airbag cushion 30 is stowed in the space surrounded by the top wall 332 and the peripheral wall 333. The module cover 33 is, for example, formed from resin.

On the side opposite the top wall 332, the peripheral wall 333 has a plurality of engagement protrusions 338a, 338b, and 338c. The engagement protrusions 338a, 338b, and 338c engage respectively with the engagement slits 38a, 38b, and 38c of the housing 31 bottom wall 36 (see FIGS. 2 and 4). This engagement mounts the module cover 33 to the housing 31.

The engagement protrusions 338a, 338b, and 338c respectively extend so as to protrude from the peripheral wall 333 toward the Z-axis direction negative side and have elasticity and a hook shape. For example, the engagement protrusion 338c includes an elastic projecting part 340 that protrudes from the peripheral wall 333 in the Z-axis direction negative side and a hook engaging part 341 formed on the tip end part of the projecting part 340 facing outward. The hook engaging part 341 includes an oblique surface 344 for guiding insert action when the engagement protrusion 338c is inserted in the engagement slits 38c and an engagement surface 345 that contacts and engages with the edge opening of the engagement slits 38c (Z-axis direction negative side surface of the bottom wall 36).

Of the engagement protrusions 338a, 338b, and 338c, the engagement protrusion 338c extends further than the other engagement protrusions 338a and 338b. In detail, the hook engaging part 341 of the engagement protrusion 338c extends further to the Z-axis direction negative side than the hook engaging parts 341 for the engagement protrusions 338a and 338b. However, for the engagement protrusions 338a, 338b, and 338c, the position of the engagement surface 345 in the Z-axis direction is the same as each other. Furthermore, of the engagement protrusions 338a, 338b, and 338c, the engagement protrusion 338c functions as a stopper contact part 300 that contacts a stopper 200 of the boss part 20 (see below for details).

Returning to FIGS. 4 and 5, the support units 4a and 4b will be described. There are a plurality of support units 4a and 4b (two in this case) respectively, and these are provided on the bottom part of the airbag module 3. Two support units 4a and 4a are provided on the positive side in the Y-axis direction and two support units 4b and 4b are provided on the negative side in the Y-axis direction at both sides in the X-axis direction. From another perspective, the airbag module 3 can be viewed as an analog 12-hour clock in a plane perpendicular to the Z-axis direction, with support units 4a and 4a roughly positioned at 2 o'clock and 10 o'clock and support units 4b and 4b at 4 o'clock and 8 o'clock.

Note that the number and arranged locations of the support units 4a and 4b can be set as appropriate. For example, in other embodiments, the number of support units 4a may be three, and they may be positioned at 3 o'clock, 6 o'clock, and 9 o'clock when viewed on an analog 12-hour clock. In addition, one of the support units 4a and the support unit 4b may be omitted. As long as movability of the airbag module 3 (in particular movement along the Z-axis direction and rocking in a direction that intersects with the Z-axis direction) relative to the core metal 2 can be ensured by the support unit, any type of support unit can be used. As an example, the support unit 4a with a damper function and the support unit 4b, which is different therefrom, will be described.

The support unit 4a includes a pin 41, a spring 42, and a damper assembly 43, and constitutes a module damper that transmits core metal 2 vibration to the airbag module 3. In other words, the support unit 4a functions as a dynamic damper that dampens vibrations from the vehicle.

The damper assembly 43 is mounted in the opening part 34a at the bottom part of the airbag module 3. The damper assembly 43 includes an elastic body 45, an inner sleeve 46 and outer sleeve 47 that retain the elastic body 45, and an annular piece 48 that covers the upper surface of the elastic body 45. The elastic body 45 is for suppressing steering wheel 1 vibration and is formed in an annular shape out of rubber, silicone, or the like. The inner sleeve 46, outer sleeve 47, and annular piece 48 are composed of, for example, resin, and the elastic body 45 is retained in the spaces surrounded by these.

The pin 41 is slipped into the inner sleeve 46. The inner sleeve 46 is configured to enable sliding in the Z-axis direction relative to the pin 41. An outer sleeve 47 is mounted in the opening part 34a. This manner of mounting secures the support unit 4a to the bottom part of the airbag module 3. Therefore, when the airbag module 3 moves in the Z-axis direction, the damper assembly 43 also moves in the Z-axis direction together with the airbag module 3 and during this movement, the inner sleeve 46 of the damper assembly 43 moves relative to the pin 41.

The pin 41 extends in the Z-axis direction and is inserted into the opening part 34a inside an inner sleeve 46. The first end of the pin 41 in the Z-axis direction is formed in a flange shape and the upper part of the damper assembly 43 (outer edge of inner sleeve 46 and upper end of annular piece 48 and outer sleeve 47) is positioned at the bottom of this flange part. In addition, a second end of the pin 41 in the Z-axis direction is inserted inside the collar 51 and into the mounting hole 27. A retaining spring 52 mounted on the core metal 2 engages with an engaging groove 44 at the tip end part of the pin 41; thereby, the pin 41 is secured to the core metal 2.

The spring 42 is composed of a coil spring provided so as to wrap around the pin 41 and biases the airbag module 3 in a direction separating from the core metal 2. A first end of the spring 42 is retained on a retaining part 46a of the inner sleeve 46 and a second end is a free end (see FIG. 4). This free end seats on the top of the flange part 53 of the collar 51.

As depicted in FIG. 4, the support unit 4b includes a bushing 61 and a spring 62 and biases the airbag module 3 in a direction separating from the core metal 2. The bushing 61 is secured to the bottom part (locking plate 34) of the airbag module 3. The spring 62 is composed of a coil spring with a first end retained in the bushing 61 and a second end as a free end. This free end is seated on the spring receiving surface 28 of the boss part 20.

Next, returning to FIGS. 3 and 4, an example of a horn mechanism 70 included on the steering wheel 1 will be described.

The horn mechanism 70 includes a movable contact 71 and a fixed contact 72. As depicted in FIG. 4, the movable contact 71 is provided on the airbag module 3. Here, the movable contact 71 is arranged in two locations on the flat plate part of the locking plate 34. As depicted in FIG. 3, the fixed contact 72 is arranged in two locations of the boss part 20 of the core metal 2. In detail, the fixed contacts 72 and 72 are provided on the top surfaces 29a and 29a of the protruding parts 29 and 29. The movable contact 71 and the fixed contact 72 are connected to a horn circuit (not depicted) that sounds a horn when energized.

The movable contact 71 and the fixed contact 72 normally face each other in the Z-axis direction with a gap therebetween. When the airbag module 3 (module cover 33) is pushed toward the metal core 2 in the Z-axis direction negative side from this state, the airbag module 3 approaches the core metal 2 against the biasing force of the springs 42 and 62 of the support units 4a and 4b, and the movable contact 71 comes into contact with the fixed contact 72. This contact causes the horn mechanism 70 to enter horn activated state and sounds the horn. On the other hand, when pushing on the airbag module 3 is released, the airbag module 3 is returned to the original position thereof based on the bias force of the springs 42 and 62, and put in a horn non-operating state.

In other embodiments, a separate or additional horn mechanism 70 may be provided. For example, as depicted in FIG. 5, a movable contact 71a of a horn mechanism 70a may be provided on the bottom wall 36 of the housing and a fixed contact 72a of the horn mechanism 70a may be provided at the first end of the pin 41 in the Z-axis direction.

Figure 8:
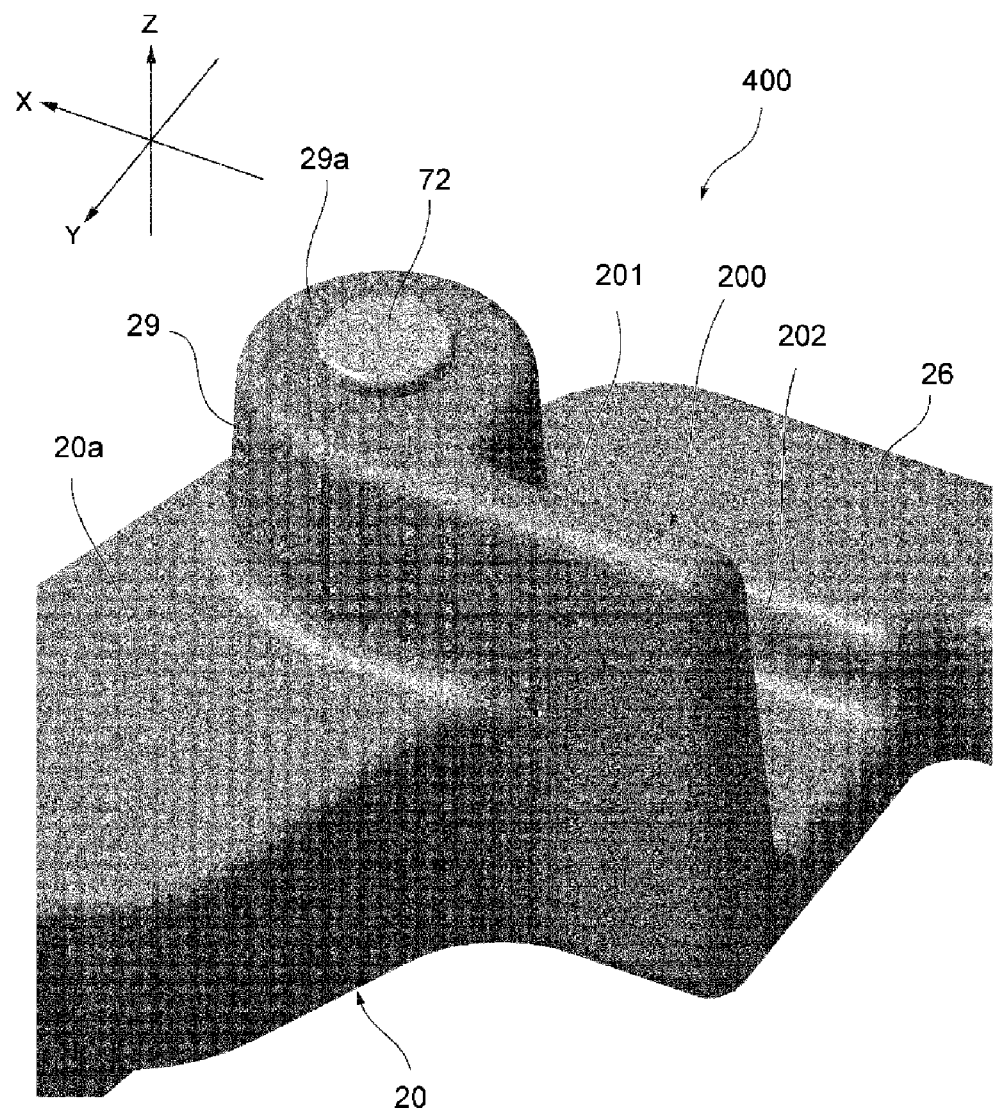
FIG. 8 is a perspective view depicting the enlarged area around a stopper of the boss part from a different direction than that of FIG. 3.
Figure 9:
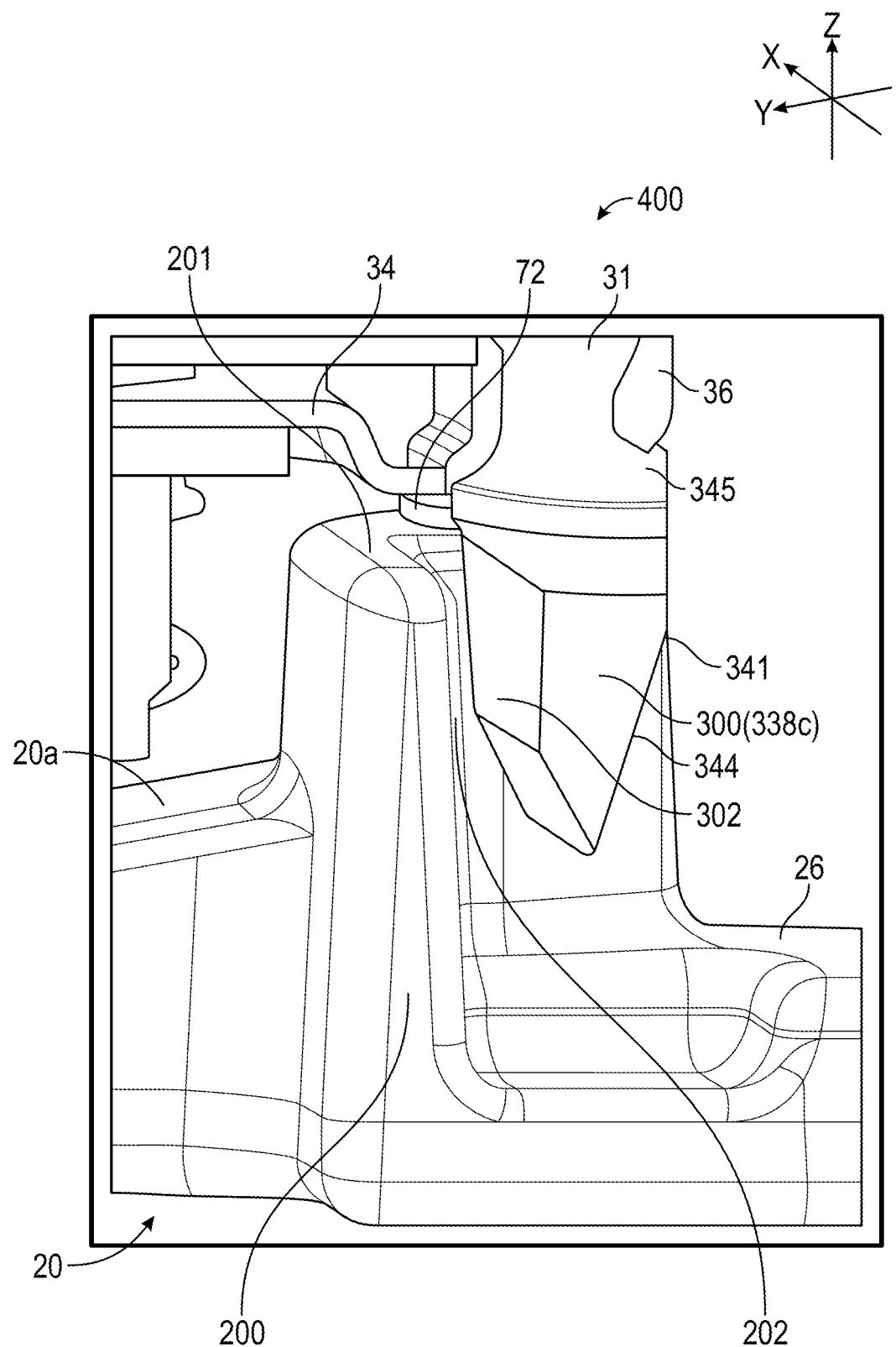
FIG. 9 is a perspective view depicting the enlarged area around the stopper and a stopper contact part.
Figure 10:
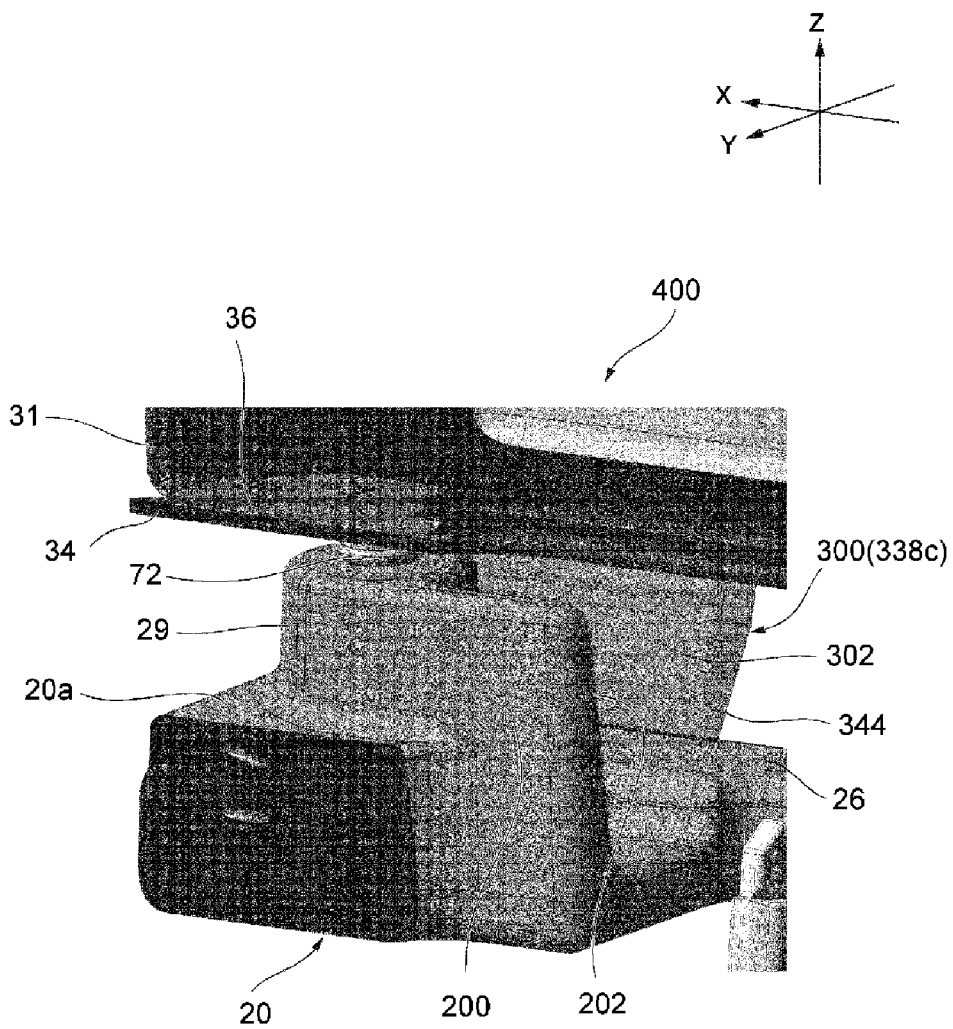
FIG. 10 is a perspective view depicting the stopper and the stopper contact part from a different direction than that of FIG. 9.

Next, with reference to FIGS. 8 to 10, the rocking suppression structure 400 (stopper 200 and stopper contact part 300) of the airbag module 3 will be described.

In a non-activated state of the airbag, the airbag module 3 is elastically supported on the core metal 2 by the spring 42 of the support unit 4a and the coil spring 62 of the support unit 4b and is movable relative to the core metal 2 (in particular, movable in the Z-axis direction).

On the other hand, when the airbag is activated, based on the expanded and deployed airbag cushion 30, the airbag module 3 rocks relative to the core metal 2 in a direction intersecting the Z-axis direction while being supported by the spring 42 of the support unit 4a and the coil spring 62 of the support unit 4b. In the present embodiment, the rocking suppression structure 400 suppresses unnecessary rocking of the airbag module 3 in the Y-axis direction positive side relative to the core metal 2 to prevent this manner of rocking.

The rocking suppression structure 400 includes the stopper 200 included on one of the boss part 20 or the airbag module 3 and the stopper contact part 300 included on the other of the boss part 20 or the airbag module 3. As described above, herein the stopper 200 is provided on the boss part 20 and the stopper contact part 300 is provided on the module cover 33 of the airbag module 3. In addition, the engagement protrusion 338c of the module cover 33 functions as the stopper contact part 300.

With the airbag in a non-activated state, the stopper 200 is separated from the stopper contact part 300. The stopper 200 and the stopper contact part 300 face each other with, for example, a roughly 2 mm gap therebetween. On the other hand, with the airbag activated, expansion and deployment of the airbag cushion 30 moves or deforms the airbag module 3; thereby, the stopper 200 comes into contact with the stopper contact part 300.

The stopper 200 is provided on the boss part 20 so as to extend in the Z-axis direction. In detail, the stopper 200 rises from the base surface 20a of the boss part 20 in a wall shape on the positive side of the Z-axis direction. In addition, the stopper 200 is formed slightly tape from a top surface 201 to the base thereof. The stopper 200 is integrally formed with the boss part 20. For example, when the core metal 2 is formed by casting, the stopper 200 is formed together with other portions of the boss part 20 of the core metal 2.

The stopper 200 is connected to the protruding part 29 of the boss part 20. Specifically, the stopper 200 is connected to the side of the protruding part 29 at the first end in the width direction (X-axis direction), which is orthogonal to both the height and thickness directions. The second end of the stopper 200 in the width direction faces the space between the shaft mounting part 23 and the bridging part 26. The height (wall height) of the stopper 200 is the same as the height of the protruding part 29 and the top surface 201 of the stopper 200 is flush with and connected to the top surface 29*a* of the protruding part 29.

The stopper 200 comes into contact with the stopper contact part 300 in a direction that intersects with the Z-axis direction when the airbag is activated. Here, the stopper 200 comes into contact with the stopper contact part 300 in the Y-axis direction. Therefore, the stopper 200 includes a contact surface 202 as a wall surface on the negative side in the Y-axis direction that comes into contact with the stopper contact part 300.

The stopper 200 is positioned on the negative side in the Y-axis direction as viewed from the shaft mounting part 23 (steering shaft 100). Here, there are two stoppers 200 arranged symmetrically with respect to the Y-axis (see FIG. 3). In further detail, with viewing the core metal 2 as an analog 12-hour clock as described above, the stoppers 200 and 200 can be viewed as being positioned at 4 and 8 o'clock.

The stopper contact part 300 (engagement protrusion 338*c*) is provided on the module cover 33 so as to extend in the Z-axis direction. The stopper contact part 300 extends so as to protrude from the module cover 33 and the tip end side faces the stopper 200 while a part of what is not the tip end side (engagement surface 345) engages with the bottom wall 36 of the housing 31. In addition, the tip end of the stopper contact part 300 is separated from the surface (base surface 20*a*) of the boss part 20.

The stopper contact part 300 includes a contact surface 302 that faces the contact surface 202 of the stopper 200. A contact surface 302 is a part of an inner surface of the stopper contact part 300 (Y-axis direction positive side surface) and in this case is positioned on the hook engaging part 341 opposite the oblique surface 344.

The stopper contact part 300 may be provided in accordance with the number and arrangement of the stoppers 200. Here, in accordance with there being two stoppers 200, there are two stopper contact parts 300 arranged symmetrically with respect to the Y-axis (see FIG. 4). In other embodiments, the number and arrangement of the stopper contact parts 300 may be changed. For example, it is possible to have only one stopper contact part corresponding to a plurality of stoppers 200, and vice versa.

Figure 11:
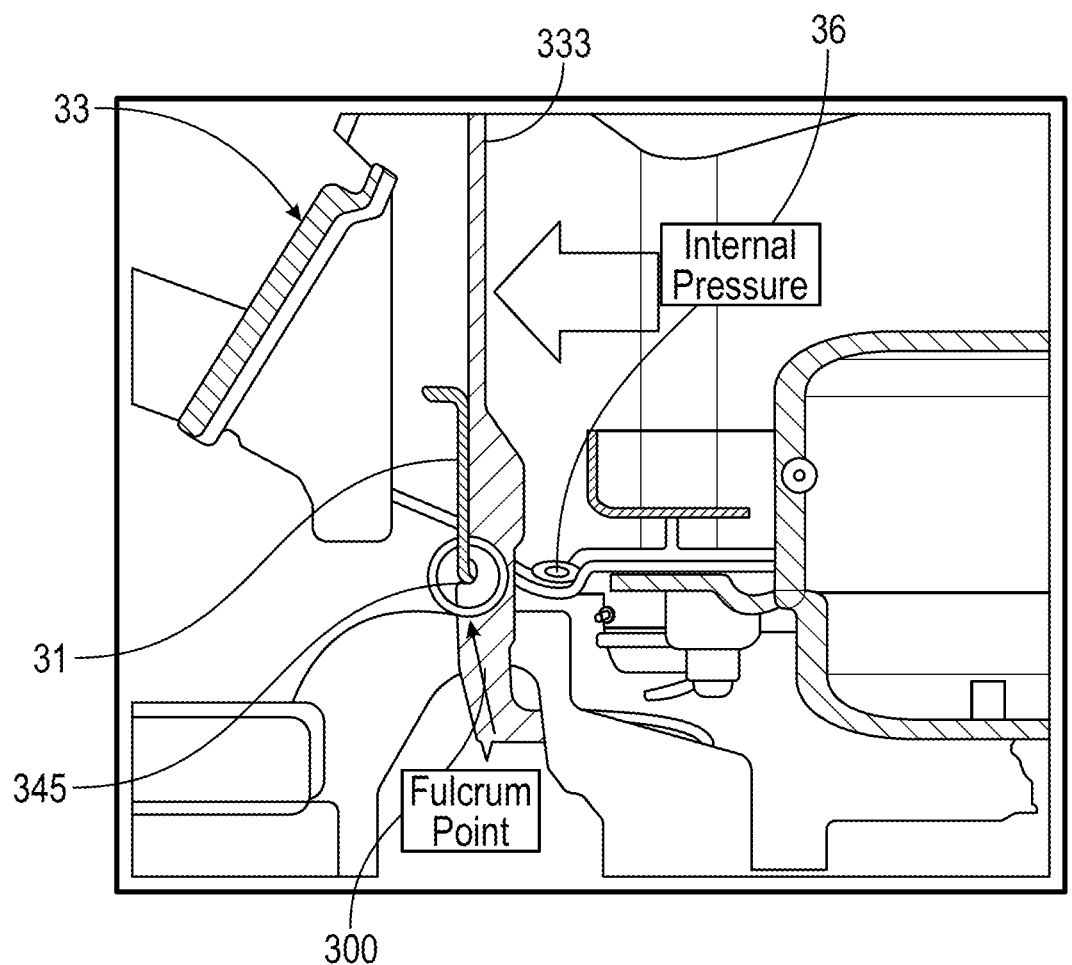
FIG. 11 is a cross section view depicting the enlarged area around the stopper and the stopper contact part.
Figure 12:
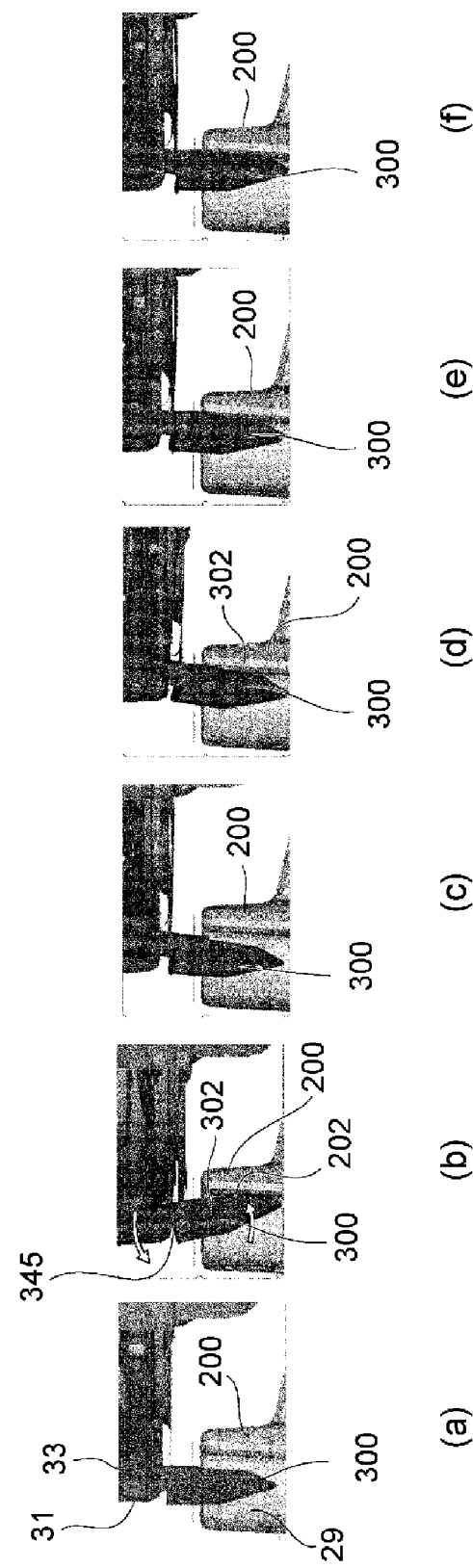
FIG. 12 is a diagram depicting time elapse of the stopper and the stopper contact part structure during airbag activation.

Referring to FIGS. 11 and 12, the relationship between the stopper 200 and the stopper contact part 300 during airbag activation is described. FIG. 12 depicts the status of the stopper 200 and stopper contact part 300 during airbag activation over time. FIG. 12(*a*) depicts prior to starting airbag activation (in other words, non-activated state). FIG. 12(*b*) to (*f*) depict the state after airbag activation over time, for example FIG. 12(*b*) depicts the state of 3 ms after start of airbag activation.

In the airbag non-activated state depicted in FIG. 12(*a*), the stopper 200 is separated from the stopper contact part 300. On the other hand, during airbag activation depicted in FIG. 12(*b*) to (*f*), the stopper contact part 300 moves with respect to the stopper 200 and comes into contact with the stopper 200. This is caused by the airbag module 3 being deformed or moved by the expanding and deploying airbag cushion 30.

Specifically, when the airbag cushion 30 expands and deploys, internal pressure of the airbag cushion 30 acts on the peripheral wall 333 of the module cover 33. Based on the action of the load due to expansion and deployment, the stopper contact part 300 rotates inward with the engagement location (engagement surface 345) with the housing 31 as a fulcrum point (see FIG. 12(*b*)). This manner of rotation causes the leading side (herein, leading side of the contact surface 302) of the stopper contact part 300 to contact the contact surface 202 of the stopper 200.

Upon expansion and deployment of the airbag cushion 30, the internal pressure of the airbag cushion 30 causes the airbag module 3 to rock relative to the core metal 2 in a direction that intersects the Z-axis direction (for example, the XY plane). This manner of rocking causes the stopper contact part 300 to temporarily be separated from the stopper 200 (see FIG. 12(*c*)) but as the rocking airbag module 3 moves to the positive side in the Y-axis direction, the leading side of the stopper contact part 300 (herein base end of the contact surface 302) comes into contact again with the contact surface 202 of the stopper 200 (see FIG. 12(*d*)). Thereafter, contact of the stopper contact part 300 with the stopper 200 continues and rock direction of the airbag module 3 shifts to the Y-axis direction negative side (see FIGS. 12(*e*) and (*f*)).

In this manner, the expanding and deploying airbag cushion 30 causes the stopper contact part 300 of the airbag module 3 to deform, and thus the stopper contact part 300 comes into contact with the stopper 200. Subsequently, the stopper contact part 300 temporarily (momentarily) separates from the stopper 200 but immediately thereafter, movement of the airbag module 3 overall causes the stopper contact part 300 to come into contact with the stopper 200.

Therefore, unnecessary rocking of the airbag module 3 to the positive side in the Y-axis direction during airbag activation can be suppressed. In other words, the amount of displacement of the airbag module 3 to the Y-axis direction positive side can be suppressed to the initial clearance (roughly 2 mm) between the stopper contact part 300 and the stopper 200.

Note that even after the state depicted in FIG. 12(*f*), the airbag module 3 continues to rock for a prescribed amount of time. For example, after the state depicted in FIG. 12(*f*), the airbag module 3 is displaced to the negative side in the Y-axis direction and then is again displaced to the positive side in the Y-axis direction. Upon being displaced again to the positive side in the Y-axis direction, the stopper contact part 300 may come into contact with the stopper 200. In addition, when first displacing to the positive side in the Y-axis direction the stopper contact part 300 comes into contact with the stopper 200 (see FIG. 12(*d*) to (*f*)) so compared to a steering wheel not provided with the stopper 200 and stopper contact part 300, timing for subsequently starting displacement to the negative side in the Y-axis direction can be delayed. This leads to stable initial deployment of the airbag cushion 30.

The effects of the present embodiment described above will be described.

The steering wheel 1 according to the embodiment includes the core metal 2 having the boss part 20 configured to be mountable on the steering shaft 100 and the airbag module 3 provided so as to be movable with respect to the core metal 2 and containing the airbag cushion 30 that can be expanded and deployed, wherein a first of the core metal 2 and airbag module 3 includes the stopper 200 and a second of the core metal 2 and the airbag module 3 includes the stopper contact part 300. Furthermore, the stopper 200 is configured so as to be separated from the stopper contact part 300 in a non-activated state of the airbag, and to come into contact with the stopper contact part 300 due to movement or deformation of the airbag module 3 caused by expansion and deployment of the airbag cushion 30 during activation of the airbag.

With this aspect, interference (contact between the stopper 200 and the stopper contact part 300) occurs between the core metal 2 and the airbag module 3 moved or deformed during activation of the airbag. Thus, in the event that the airbag module 3 rocks with respect to the core metal 2 during activation of the airbag, unnecessary rocking of the airbag module 3 can be suppressed. Therefore, prescribed deployment performance of the airbag cushion 30 can be ensured.

In addition, with the embodiment, the stopper 200 is provided on the boss part 20 of the core metal 2 and the stopper contact part 300 is provided on the airbag module 3. Thus, suppression of unnecessary rocking of the airbag module 3 can be achieved by effectively using the boss part 20 and airbag module 3.

Furthermore, with the embodiment, the stopper 200 comes into contact with the stopper contact part 300 in a direction (for example, Y-axis direction as described above) that intersects with the Z-axis direction. Therefore, unnecessary rocking of the airbag module 3 can be suppressed in the direction that intersects with the Z-axis direction.

In addition, with the embodiment, there are a plurality of stoppers 200 that are arranged symmetrically with respect to the Y-axis. Thus, the airbag module 3 can be well balanced with unnecessary rocking suppressed during activation of the airbag.

In addition, with the embodiment, the stopper 200 rises in a wall shape from the surface of the boss part 20 in the Z-axis direction. Furthermore, a protruding part 29 protruding in the Z-axis direction is formed on the surface of the boss part 20, a fixed contact 72 of the horn mechanism 70 is provided on the protruding part 29, and at least a portion of the stopper 200 extending in the Z-axis direction is connected to the protruding part 29. Thus, the protruding part 29 can be used effectively for the horn mechanism 70 enabling increasing the strength of the stopper 200 itself.

Furthermore, with the embodiment, the stopper contact part 300 is formed on at least one of the plurality of engagement protrusions 338a, 338b, and 338c (in the example described above, on the two engagement protrusions 338c) that mount the module cover 33 to the housing 32. Thus, the structure for mounting the module cover 33 to the housing 32 can effectively be utilized and the stopper contact part 300 can be provided on the airbag module 3 side.

The embodiment described above is for ease of understanding of the present invention and is not intended to be construed as limiting the present invention. Elements included in the embodiment, as well as arrangements, materials, conditions, shapes, sizes, and the like thereof, are not limited to those exemplified, but rather can be appropriately changed.

For example, the number, arrangement, and contact direction of the stoppers 200 can be changed. For example, in the case of only one stopper, a stopper can be provided at only the 6 o'clock direction position on an analog 12-hour clock. Alternatively, the second end of the two stoppers 200 and 200 described above can be connected to form a single stopper. However, in this case, it goes without saying that the tab 39 must be avoided.

Also, in addition to or separately from the stopper 200 configuration described above, a stopper may be provided on the positive side in the Y-axis direction as viewed from the steering shaft 100 and a stopper may be provided on the positive side and/or negative side in the X-axis direction as viewed from the steering shaft 100. Furthermore, three or more stoppers may be provided on one side (for example negative side in the Y-axis direction) in the XY cartesian coordinate system. However, in this case, the number of stoppers should be a pair of stoppers arranged symmetrically with respect to the X-axis or the Y-axis.

In addition, rather than forming a plurality of stopper contact parts 300 on the engagement protrusions 338a, 338b, and 338c, these can be formed independently. For example, a stopper contact part may be provided on a portion suspended from an inner surface of the top wall 332 of the module cover 33.

In addition, the stopper contact part 300 may be provided on a member of the airbag module 3 other than the module cover 33. For example, providing on the housing 32 or the locking plate 34 is feasible.

In addition, the stopper contact part 300 may be configured without elasticity or so as to not deform. If the stopper contact part 300 does not deform (for example, does not rotate as described above), the airbag module 3 will move overall due to the expanding and deploying airbag cushion 30 during airbag activation, and thus the stopper contact part 300 will come into contact with the stopper 200.

In addition, a shock absorbing member (cushioning material) may be provided on the portion where the stopper 200 and the stopper contact part 300 mutually come into contact (for example, one or both of the contact surface 202 and the contact surface 302), or surface-treatment for absorbing shock may be performed.

Modified Example: Addition of Reinforcement Part

Next, with reference to FIGS. 13 to 15, an example of adding reinforcement parts 510, 520, and 530 to the embodiment described above will be described.

The airbag module 3 includes reinforcement parts 510, 520, and 530 on the side opposite the stopper 200 as viewed from the stopper contact part 300. The reinforcement parts 510, 520, and 530 are configured to prevent deformation of the stopper contact part 300 when the stopper 200 comes into contact with the stopper contact part 300. This manner of deformation prevention is in particular effective in the case the stopper contact part 300 is formed on the module cover 33 composed of a relatively soft material. The reinforcement parts 510, 520, and 530 can be configured using additional members added to the airbag module 3 described above (see FIG. 13), or can be configured using a member (housing 31 or locking plate 34) of the airbag module 3 described above (see FIG. 14, FIG. 15).

Figure 13B:
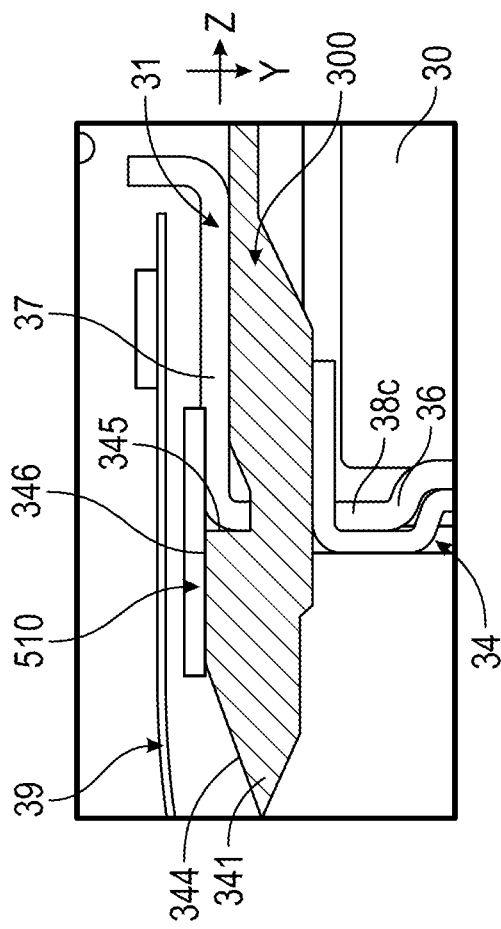
FIG. 13 is a diagram depicting a reinforcement part according to a first example of Embodiment 1, where (A) is an airbag module bottom surface enlarged view of the stopper contact part and reinforcement part area, (B) is a cross section view along line B-B in (A), and (C) is a cross section view along line C-C in (A)
Figure 13C:
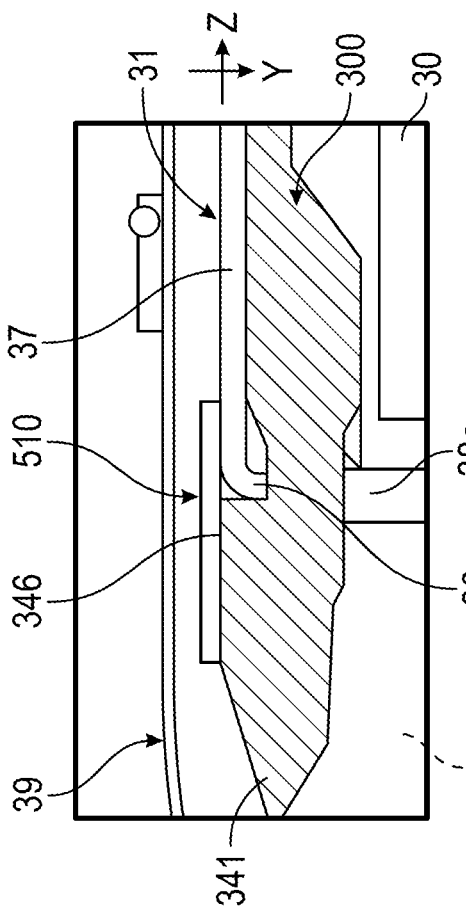
Figure 13A:
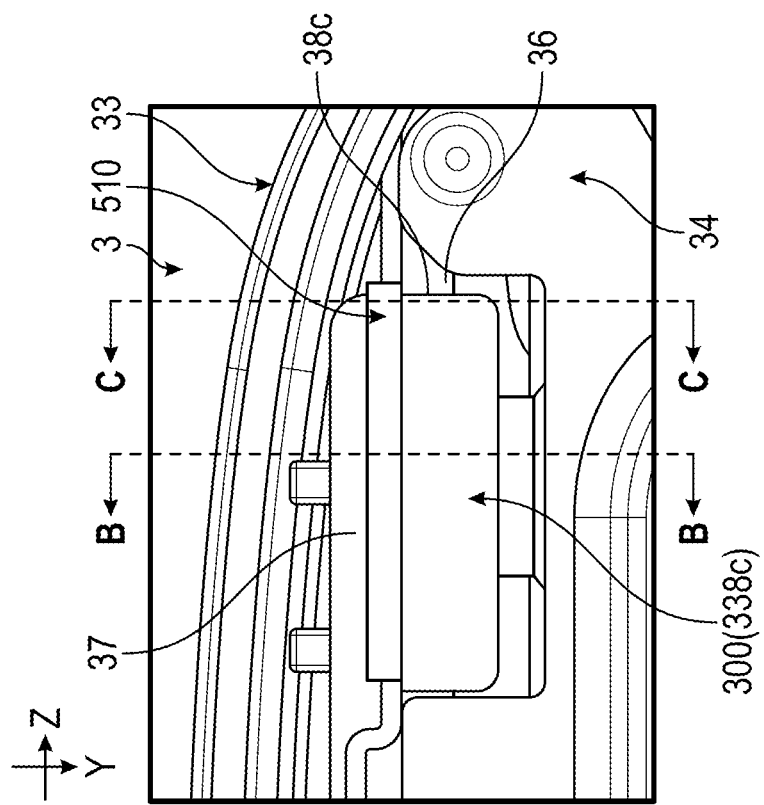

For example, as depicted in FIG. 13, the reinforcement part 510 can be configured using a reinforcement plate mounted on the housing 31. Various methods can be used to attach the reinforcement plate, such as screws, rivets, bolts, or welding. Here, welding enables easy mounting. The reinforcement part 510 is mounted on the lower end of the peripheral wall 37 of the housing 31 and extends to the negative side in the Z-axis direction past the bottom wall 36 so as to protrude from the bottom wall 36. A reinforcement part 510 is positioned on the Y-axis direction negative side of the stopper contact part 300 and faces a straight surface 346 of the hook engaging part 341. The straight surface 346 is a surface connecting the oblique surface 344 and the engagement surface 345 on the hook engaging part 341.

During airbag activation, contact of the stopper 200 and the stopper contact part 300 suppresses unnecessary rocking of the airbag module 3 to the positive side in the Y-axis direction. Here, the stopper contact part 300 is pressed to the negative side in the Y-axis direction by the stopper 200 and the stopper contact part 300 contacts the reinforcement part 510. Thus, elastic deformation and/or plastic deformation of the stopper contact part 300 is prevented.

FIG. 14 depicts and example of the reinforcement part 520 formed on the housing 31. Here, the reinforcement part 520, formed by cutting away a part of the bottom wall 36 of the housing 31, protrudes from the bottom wall 36 and extends to the negative side in the Z-axis direction. Specifically, the reinforcement part 520 is formed by further cutting away a part of the engagement slits 38c of the bottom wall 36 described above to the negative side in the Y-axis direction and then raising this cut portion to the negative side in the Z-axis direction. Here, reinforcement parts 520 and 520 are formed at both end parts of the engagement slits 38c in the X-axis direction and the engagement surface 345 engages with the bottom wall 36 of the housing 31 between these reinforcement parts 520 and 520. The reinforcement part 520 is positioned on the Y-axis direction negative side of the stopper contact part 300 and at least faces the straight surface 346 of the hook engaging part 341.

During airbag activation, contact of the stopper 200 and the stopper contact part 300 suppresses unnecessary rocking of the airbag module 3 to the positive side in the Y-axis direction. Here, the stopper contact part 300 is pressed to the negative side in the Y-axis direction by the stopper 200 and the stopper contact part 300 contacts the reinforcement part 520. Thus, elastic deformation and/or plastic deformation of the stopper contact part 300 is prevented. With the reinforcement part 520 depicted in FIG. 14, forming the bottom wall 36 of the existing member (housing 31) enables preventing deformation of the stopper contact part 300, eliminating the need for a new member such as the reinforcement part 510 depicted in FIG. 13.

Figure 15A:
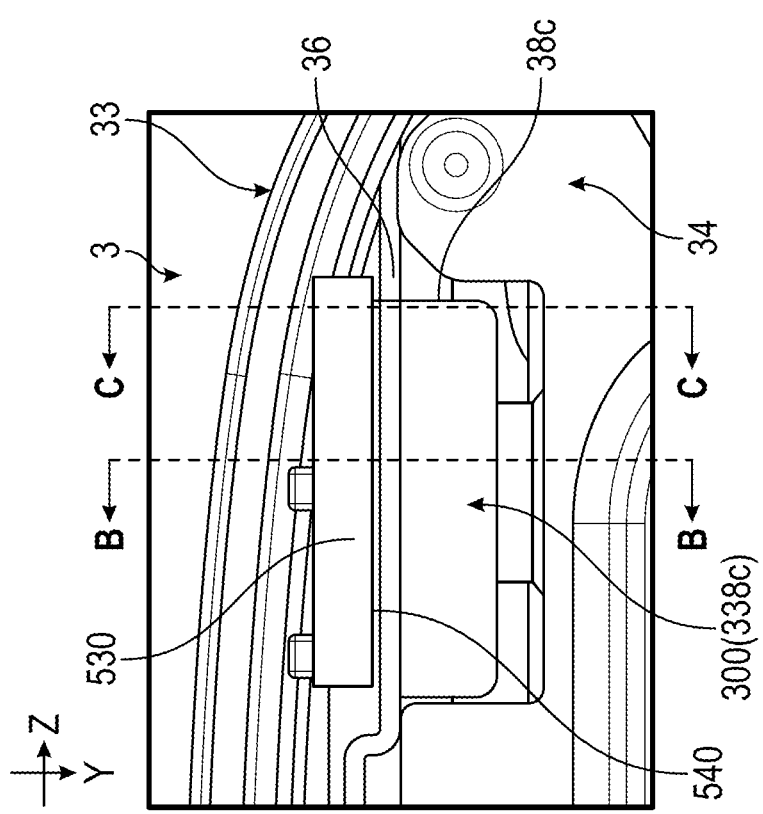
FIG. 15 is a diagram depicting a reinforcement part according to a third example of Embodiment 1, where (A) is an airbag module bottom surface enlarged view of the stopper contact part and reinforcement part area, (B) is a cross section view along line B-B in (A), and (C) is a cross section view along line C-C in (A)
Figure 15B:
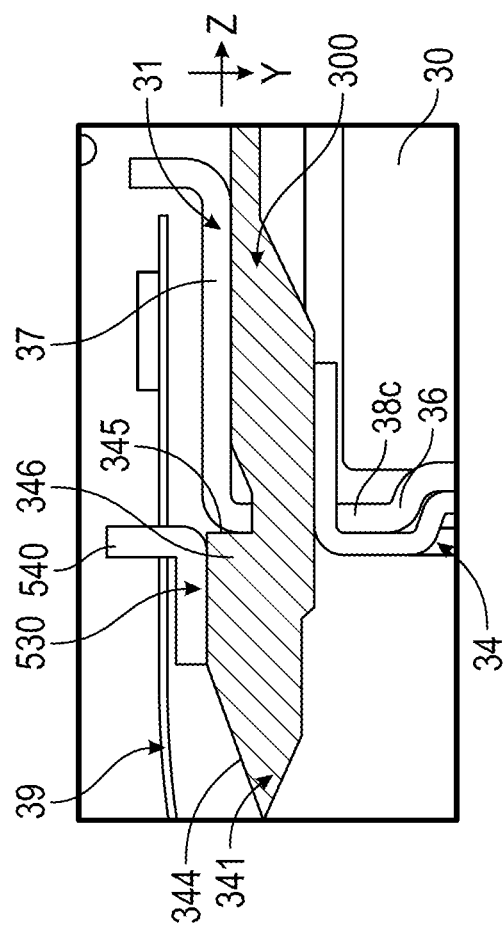
Figure 15C:
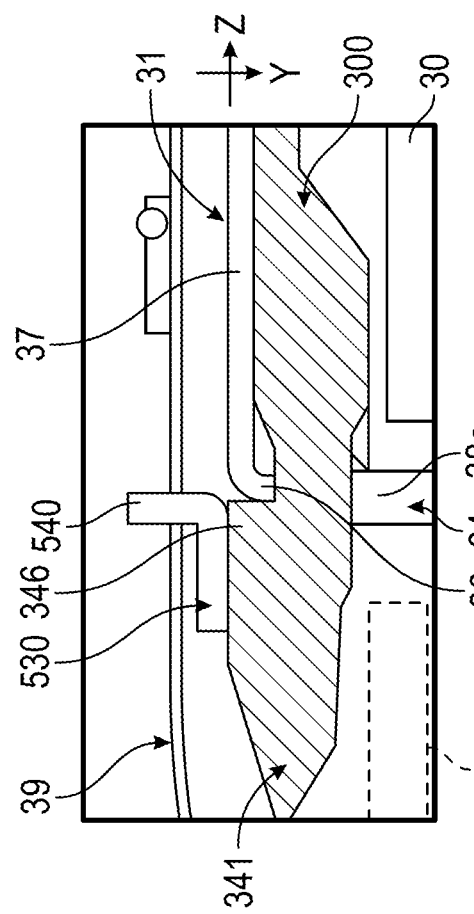

FIG. 15 depicts an example of forming the reinforcement part 530 on the locking plate 34. Here, the reinforcement part 530, formed by cutting a part of the flat portion of the locking plate 34, protrudes from the locking plate 34 and extends to the negative side in the Z-axis direction. Specifically, a portion 540 is formed on the locking plate 34 so as to surround the stopper contact part 300 and a portion rising to the negative side in the Z-axis direction is provided on the portion on the negative side in the Y-axis direction that is a part thereof. This raised portion is the reinforcement part 530. A reinforcement part 530 is positioned on the Y-axis direction negative side of the stopper contact part 300 and faces the straight surface 346 of the hook engaging part 341.

During airbag activation, contact of the stopper 200 and the stopper contact part 300 suppresses unnecessary rocking of the airbag module 3 to the positive side in the Y-axis direction. Here, the stopper contact part 300 is pressed to the negative side in the Y-axis direction by the stopper 200 and the stopper contact part 300 contacts the reinforcement part 530. Thus, elastic deformation and/or plastic deformation of the stopper contact part 300 is prevented. With the reinforcement part 530 depicted in FIG. 15, forming of the flat portion of the existing member (locking plate 34) enables preventing deformation of the stopper contact part 300, eliminating the need for a new member such as the reinforcement part 510 depicted in FIG. 13.

Embodiment 2

Figure 16:
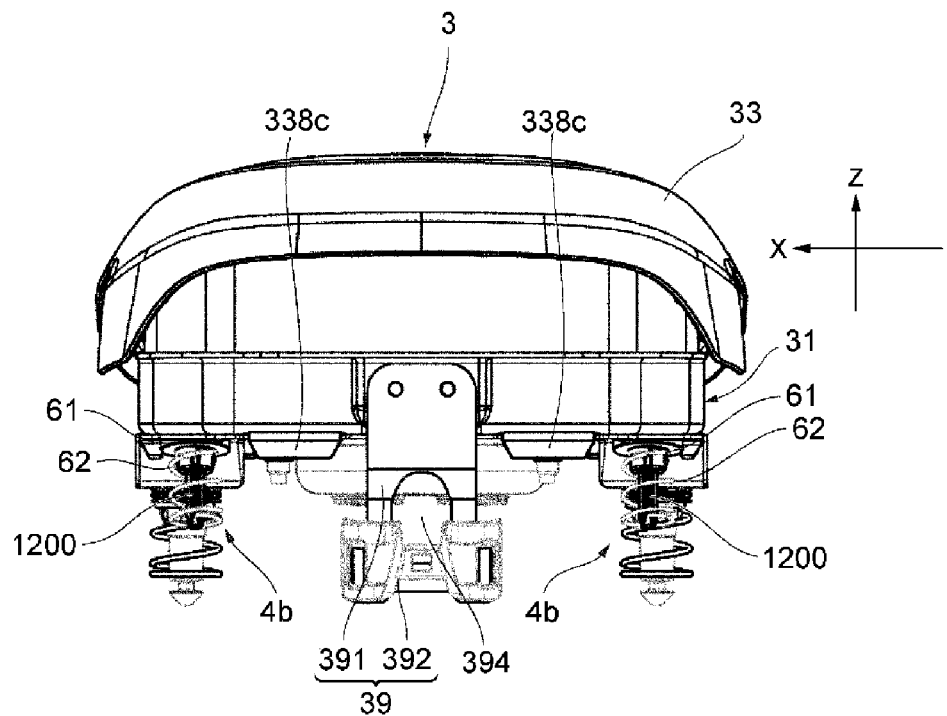
FIG. 16 is a side view of an airbag module of a steering wheel according to Embodiment 2 as viewed from the negative side in the Y-axis direction.
Figure 17:
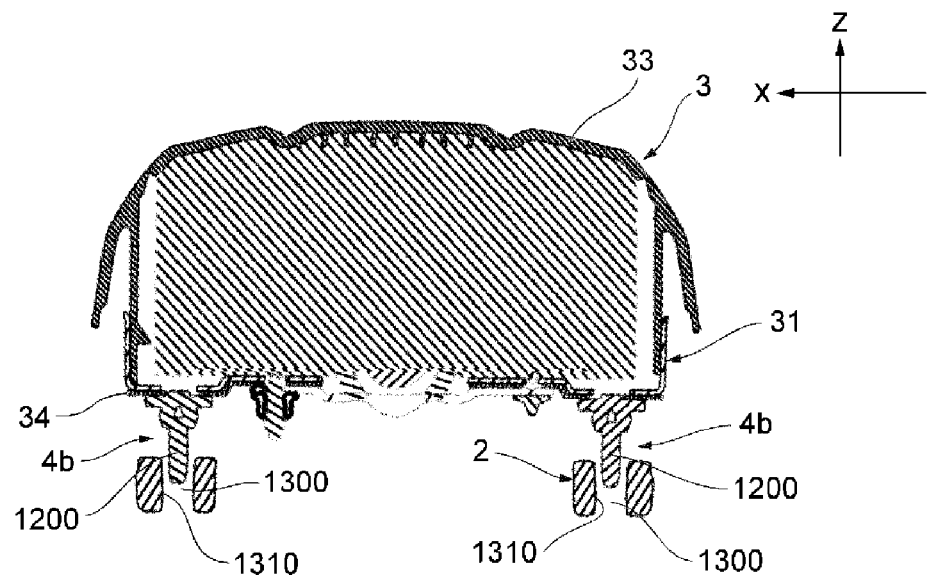
FIG. 17 is a vertical cross section view of the airbag module of FIG. 16 at the position through which the stopper and stopper contact part pass and depicts the relationship between the stopper and the stopper contact part.
Figure 18:
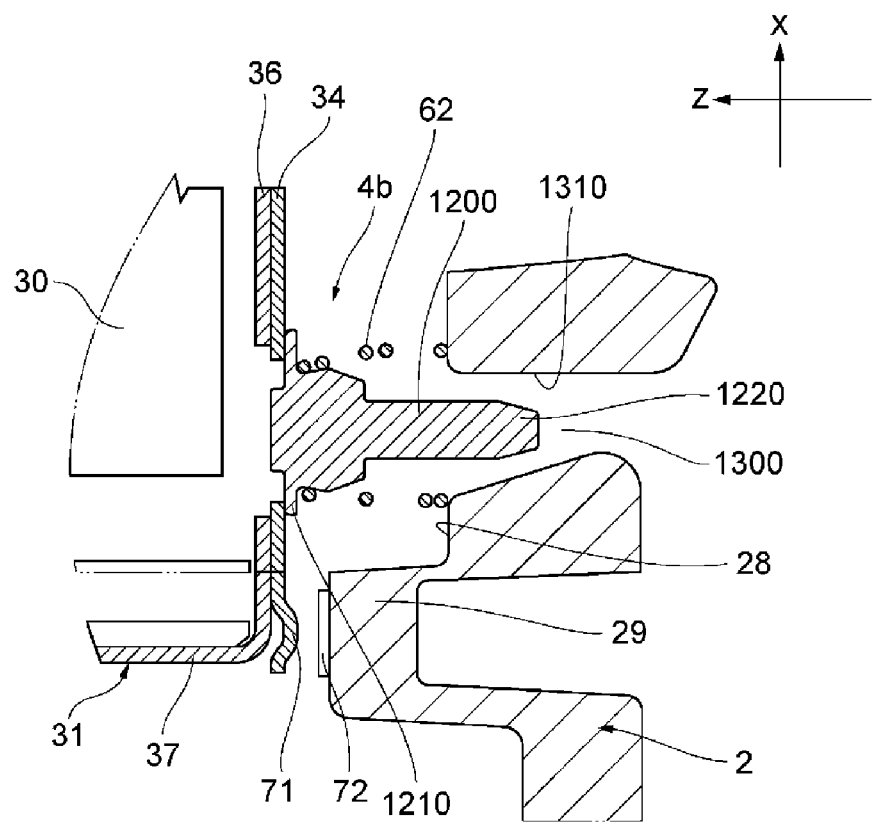
FIG. 18 is an enlarged horizontal cross section view of the airbag module of FIG. 16 at the position through which the stopper and stopper contact part pass and depicts the relationship between the stopper and the stopper contact part.

Next, with reference to FIGS. 16 to 18, a stopper 1200 and stopper contact part 1300 according to Embodiment 2 will be described. In Embodiment 2, the stopper 1200 is provided protruding in the Z-axis direction and the stopper contact part 1300 is formed as a receiving hole into which the stopper 1200 loosely fits. Furthermore, during airbag activation, the stopper 1200 is configured to come into contact with the receiving hole inner surface 1301.

For example, the stopper contact part 1300 is formed on the core metal 2. In detail, the stopper contact part 1300 is formed penetrating the spring receiving surface 28 of the core metal 2. The stopper 1200 is formed as a pin member and is provided positioned on the support unit 4b. In detail, the stopper 1200 extends in the Z-axis direction and is arranged on the inside of the spring 62 of the support unit 4b. A first end 1210 of the stopper 1200 in the Z-axis direction is secured to the bushing 61 of the support unit 4b or to the bottom part (locking plate 34) of the airbag module 3. A second end 1220 of the stopper 1200 in the Z-axis direction is inserted into the receiving hole as the stopper contact part 1300 and is separated from a receiving hole inner surface 1310 around the periphery by a prescribed clearance. This clearance can be considered to be the same as, for example, the clearance (roughly 2 mm) between the stopper contact part 300 and the stopper 200 in Embodiment 1.

With this aspect, interference (contact between the stopper 1200 and the stopper contact part 1300 inner surface 1310) occurs between the core metal 2 and the airbag module 3 moved during activation of the airbag. Thus, in the event that the airbag module 3 rocks with respect to the core metal 2 during activation of the airbag, unnecessary rocking of the airbag module 3 can be suppressed. In addition, since the stopper contact part 1300 is a hole into which the stopper 1200 loosely fits in the peripheral direction, a stopper function in a plurality of directions (all directions that intersect the Z-axis direction) including the X-axis direction can be achieved in addition to that in the Y-axis direction.

Embodiment 2 described above is for ease of understanding of the present invention and is not intended to be construed as limiting the present invention. To the extent technically feasible, the configuration (including modifications) such as arrangement and the like regarding the stopper 200 and stopper contact part 300 for Embodiment 1 can be applied to Embodiment 2. In addition, combinations of Embodiment 2 and Embodiment 1 are feasible.

Embodiment 3

Figure 19:
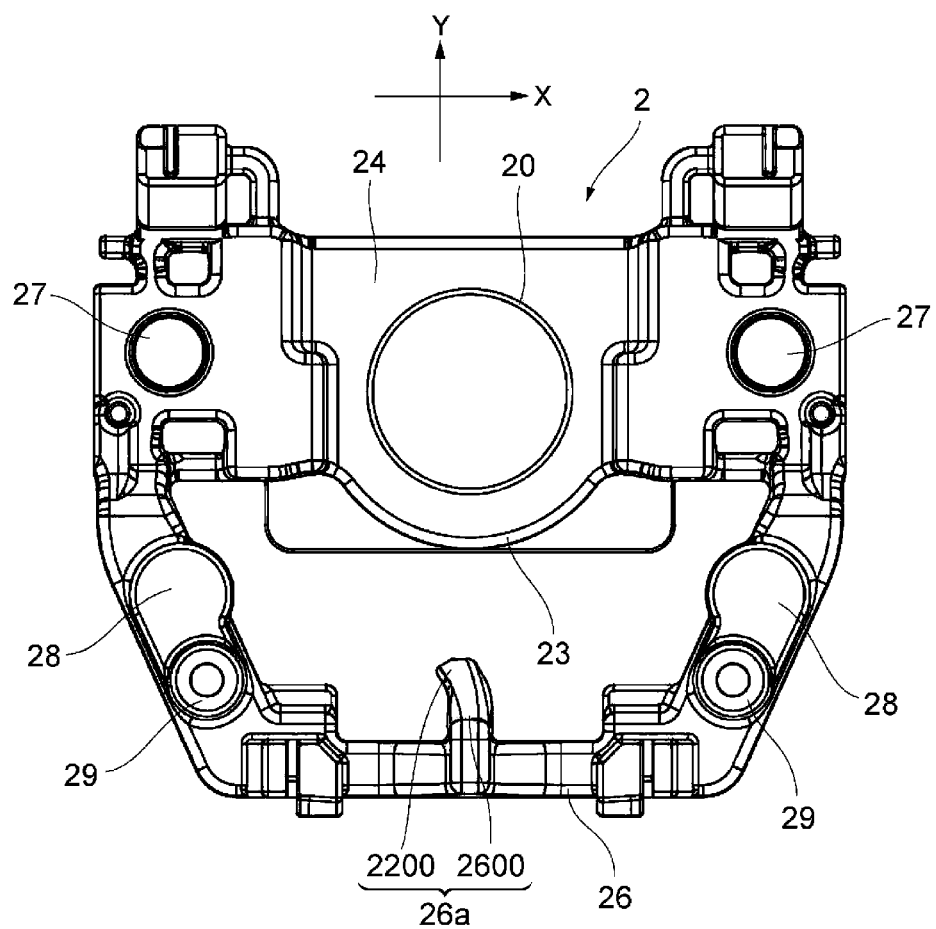
FIG. 19 is a plan view depicting a core metal of a steering wheel according to Embodiment 3.
Figure 20:
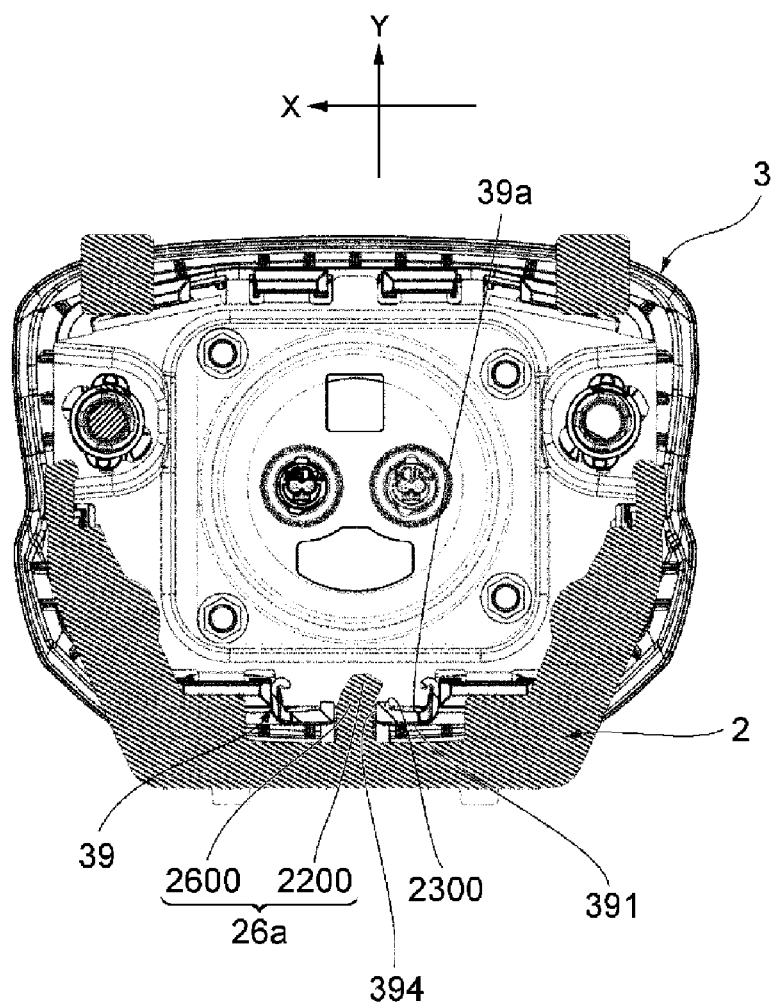
FIG. 20 is a diagram depicting a state of the core metal of FIG. 19 being projected onto the bottom surface view of the airbag module of the steering wheel according to Embodiment 3.

Next, with reference to FIGS. 19 and 20, a stopper 2200 and stopper contact part 2300 according to Embodiment 3 will be described. In Embodiment 3, the tab 39 and the tab engaging part 26a are utilized to configure the stopper contact part 2300 and the stopper 2200.

Specifically, as described above, the airbag module 3 is provided with a tab 39 having a receiving opening 394 (see FIGS. 1 and 16) and the core metal 2 is provided with a tab engaging part 26a that is inserted into the receiving opening 394 from the front side of the tab 39 to the back side of the tab 39 in a direction that intersects with the Z-axis direction (here, the Y-axis direction). The tab engaging part 26a includes the stopper 2200 on a bent portion facing a back surface 39a of the tab 39. Furthermore, the stopper 2200 is configured to come into contact with the back surface 39a of the tab 39 as the stopper contact part 2300 during airbag activation.

In detail, the tab engaging part 26a includes an engagement body 2600 extending in the Y-axis direction and the stopper 2200 that bends from the tip end of the engagement part body 2600 and extends in the X-axis direction. The base part of the engagement part body 2600 is connected to the bridging part 26. The stopper 2200 is connected to the engagement part body 2600 to enable the tip end thereof to be tilted to one side in the X-axis direction (negative side in this case). The engagement part body 2600 and the stopper 2200 are configured to enable insertion into the receiving opening 394. Upon inserting, the tab 39 is slightly twisted and the stopper 2200 passes through the receiving opening 394 from the front side of the tab 39 (negative side in the Y-axis direction) to the back side thereof (positive side in the Y-axis direction), and thereafter the twisted tab 39 is returned to the original shape. In this inserted state, the stopper 2200 faces and is separated from the back surface 39*a* of the plate spring 391 of the tab 39. In addition, in this inserted state, as described above, the end surface (upper surface) of the insulator 392 receiving opening 394 side faces the lower surface of the engagement part body 2600 and the surface of the insulator 392 on the negative side in the Y-axis direction elastically comes into contact with the base portion of the engagement part body 2600 (bridging part 26 side surface of the core metal 2) (see FIGS. 1 and 4).

With this aspect, interference (contact between the stopper 2200 and the back surface 39*a* as the stopper contact part 2300) occurs between the core metal 2 and the airbag module 3 moved during activation of the airbag. Thus, in the event that the airbag module 3 rocks with respect to the core metal 2 during activation of the airbag, unnecessary rocking of the airbag module 3 can be suppressed. In particular, when the airbag module 3 moves to the positive side in the Y-axis direction during airbag activation, the tab 39 also attempts to move to the positive side in the Y-axis direction therewith, but the back surface 39*a* of the tab 39 is in contact with and catches on the stopper 2200, restricting further movement thereof.

Embodiment 3 described above is for ease of understanding of the present invention and is not intended to be construed as limiting the present invention. To the extent technically feasible, the configuration (including modifications) such as arrangement and the like regarding the stoppers 200 and 1200 and stopper contact parts 300 and 1300 for Embodiment 1 and 2 can be applied to Embodiment 3. In addition, combinations of Embodiments 1 to 3 are feasible.

EXPLANATION OF CODES

1. Steering wheel; 2. Core metal; 3. Airbag module; 4*a*, 4*b*. Support unit; 20. Boss part; 20*a*. Base surface; 21. Rim part; 22. Spoke part; 23. Shaft mounting part; 24. Base part; 25. Inclined part; 26. Bridging part; 26*a*. Tab engaging part; 27. Mounting hole; 28. Spring receiving surface; 29. Protruding part; 29*a*. Top surface; 30. Airbag cushion; 31. Housing; 32. Inflator; 32*a*. Securing plate; 33. Module cover; 34. Locking plate; 34*a*. Opening part; 35. Bottom surface; 36. Bottom wall; 37. Peripheral wall; 38*a*, 38*b*, 38*c*. Engagement slits; 39. Tab; 39*a*. Back surface; 41. Pin; 42. Spring; 43. Damper assembly; 44. Engaging groove; 45. Elastic body; 46. Inner sleeve; 46*a*. Retaining part; 47. Outer sleeve; 48. Annular piece; 51. Collar; 52. Retaining spring; 53. Flange part; 61. Bushing; 62. Spring; 70, 70*a*. Horn mechanism; 71, 71*a*. Movable contact; 72, 72*a*. Fixed contact; 100. Steering Shaft; 200. Stopper; 201. Top surface; 202. Contact surface; 300. Stopper contact part; 302. Contact surface; 331. Top surface; 332. Top wall; 333. Peripheral wall; 338*a*, 338*b*, 338*c*. Engagement protrusions; 340. Projecting part; 341. Hook engaging part; 344. Oblique surface; 345. Engagement surface; 346. Straight surface; 391. Plate spring; 392. Insulator; 394. Receiving opening; 400. Rocking suppression structure; 510, 520, 530. Reinforcement part; 540. Portion; 1200. Stopper; 1210. First end; 1220. Second end; 1300. Stopper contact part (receiving hole); 1310. Inner surface; 2200. Stopper; 2300. Stopper contact part; 2600. Engagement part body.

The invention claimed is:

1. A steering wheel, comprising:
a core metal having a boss part configured so as to be mountable on a steering shaft, the boss part including a stopper; and
an airbag module movably provided with respect to the core metal and having:
an airbag cushion that can be expanded and deployed; and
a stopper contact part provided on a module cover, the module cover configured to cover the airbag cushion, wherein
the stopper is configured to be separated from the stopper contact part while the airbag is in a non-activated state, and to come into contact with the stopper contact part in a direction that intersects with an axial direction of the steering shaft due to movement or deformation of the airbag module caused by expansion and deployment of the airbag cushion during airbag activation.

2. The steering wheel according to claim 1, wherein with two axes that are orthogonal to the axial direction of the steering shaft and that are mutually orthogonal taken to be the vertical axis and the horizontal axis, the stopper comes into contact with the stopper contact part in at least one of the directions of the vertical axis and the horizontal axis.

3. The steering wheel according to claim 1, wherein the stopper is provided on the boss part so as to extend in the axial direction of the steering shaft.

4. The steering wheel according to claim 3, wherein the stopper rises up from the surface of the boss part in a wall shape in the axial direction of the steering shaft.

5. The steering wheel according to claim 3, wherein a protruding part that protrudes in the axial direction of the steering shaft is formed on the surface of the boss part, and at least a portion of the stopper extending in the axial direction of the steering shaft is connected to the protruding part.

6. The steering wheel according to claim 3, further comprising:
a horn mechanism including a movable contact and a fixed contact, wherein
the movable contact is provided on the airbag module, and the fixed contact is provided on a top surface of the protruding part.

7. The steering wheel according claim 3, wherein the stopper contact part is provided on the airbag module so as to extend in the axial direction of the steering shaft.

8. The steering wheel according to claim 7, wherein the airbag module includes:
an inflator that supplies gas for expansion and deployment to the airbag cushion during airbag activation;
housing in which the airbag cushion is stowed; and
the module cover, wherein the module cover is mounted on the housing so as to cover the airbag cushion.

9. The steering wheel according to claim 8, wherein the stopper contact part extends protruding from the module cover, the stopper contact part having a tip end side facing the stopper, and a portion that is not the tip end side engaging with the housing, wherein, during airbag activation, the leading side of the stopper contact part comes into contact with the stopper due to rotation of the stopper contact part with the portion described above as a fulcrum point based on the load due to expansion and deployment of the airbag cushion.

10. The steering wheel according to claim 8, wherein the airbag module further includes a reinforcement part on the side opposite the stopper as viewed from the stopper contact part configured to prevent deformation of the stopper contact part when the stopper comes into contact with the stopper contact part.

11. The steering wheel according to claim 1, wherein the airbag module includes:

an inflator that supplies gas for expansion and deployment to the airbag cushion during air bag activation; and housing in which the airbag cushion is stowed, wherein the module cover includes a plurality of engagement protrusions for engaging with the housing and mounting the module cover to the housing, and the stopper contact part is formed on at least one of the plurality of engagement protrusions.

12. The steering wheel according to claim 1, wherein the airbag module includes a tab having a receiving opening, the core metal includes a tab engaging part that is inserted into the receiving opening from the front side of the tab to the back side of the tab in a direction that intersects with the axial direction of the steering shaft, the tab engaging part includes the stopper on a bent portion facing the back surface of the tab, and the stopper is configured to come into contact with the back surface of the tab as the stopper contact part during airbag activation.

13. A steering wheel, comprising:

a core metal having a boss part configured so as to be mountable on a steering shaft, the boss part including a stopper; and an airbag module movably provided with respect to the core metal, the airbag module including;

an airbag cushion that can be expanded and deployed an inflator that supplies gas for expansion and deployment to the airbag cushion during airbag activation;

a housing in which the airbag cushion is stowed prior to airbag activation; and a module cover mounted on the housing so as to cover the airbag cushion prior to airbag activation, the module cover including a plurality of engagement protrusions for engaging with the housing and mounting the module cover to the housing, wherein a stopper contact part is formed on at least one of the plurality of engagement protrusions, and wherein the stopper is configured to be separated from the stopper contact part while the airbag is in a non-activated state, and to come into contact with the stopper contact part due to movement and deformation of the airbag module caused by expansion and deployment of the airbag cushion during airbag activation.

14. A steering wheel, comprising:

a core metal including:

a boss part configured so as to be mountable on a steering shaft; and a tab engaging part; and an airbag module movably provided with respect to the core metal, the airbag module including:

an airbag cushion that can be expanded and deployed;

a tab having a receiving opening, wherein the tab engaging part is inserted into the receiving opening from the front side of the tab to the back side of the tab in a direction that intersects with the axial direction of the steering shaft, wherein the tab engaging part includes a stopper on a bent portion facing the back surface of the tab, wherein the stopper is configured to come into contact with the back surface of the tab during airbag activation, and wherein the stopper is configured to be separated from the tab while the airbag is in a non-activated state, and to come into contact with the stopper contact part due to movement and deformation of the airbag module caused by expansion and deployment of the airbag cushion during airbag activation.

\* \* \* \* \*